US012694814B2

(12) United States Patent
Lo et al.

(10) Patent No.: US 12,694,814 B2
(45) Date of Patent: Jul. 28, 2026

(54) METHOD FOR DRIVING DISPLAY PANEL AND DRIVER CIRCUIT USING THE SAME

(71) Applicant: Novatek Microelectronics Corp., Hsinchu (TW)

(72) Inventors: Hsien-Wen Lo, Hsinchu County (TW); I-Min Chen, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 256 days.

(21) Appl. No.: 18/540,889

(22) Filed: Dec. 15, 2023

(65) Prior Publication Data

US 2025/0201164 A1 Jun. 19, 2025

(51) Int. Cl.
*G09G 3/20* (2006.01)

(52) U.S. Cl.
CPC ... *G09G 3/2074* (2013.01); *G09G 2310/0272* (2013.01); *G09G 2310/0286* (2013.01)

(58) Field of Classification Search
CPC ......... G09G 3/2074; G09G 2310/0272; G09G 2310/0286
USPC .......................................................... 345/204
See application file for complete search history.

(56) References Cited

U.S. PATENT DOCUMENTS

| | | | | |
|---|---|---|---|---|
| 6,680,741 | B1 * | 1/2004 | Yasui | G06T 15/80 345/619 |
| 2016/0322008 | A1 | 11/2016 | Sang et al. | |
| 2019/0156754 | A1 | 5/2019 | Cheng et al. | |
| 2020/0020296 | A1 | 1/2020 | Kim et al. | |
| 2020/0118475 | A1 | 4/2020 | Jang et al. | |
| 2023/0024029 | A1 | 1/2023 | Yu et al. | |

FOREIGN PATENT DOCUMENTS

| | | | | |
|---|---|---|---|---|
| CN | 107342062 A | | 11/2017 | |
| CN | 107833560 | | 3/2018 | |
| CN | 107833560 A | * | 3/2018 | G09G 3/3607 |
| CN | 115527498 | | 12/2022 | |
| CN | 115527498 A | * | 12/2022 | G09G 3/3275 |
| CN | 116863851 | | 10/2023 | |
| TW | 202101417 A | | 1/2021 | |

OTHER PUBLICATIONS

"Office Action of Taiwan Counterpart Application", issued on Mar. 5, 2025, p. 1-p. 13.
"Office Action of related Taiwan Application, application No. 113146502", issued on Nov. 6, 2025, p. 1-p. 4.

* cited by examiner

*Primary Examiner* — Mark Edwards
(74) *Attorney, Agent, or Firm* — JCIPRNET

(57) ABSTRACT

A method for driving a display panel is provided. The method includes: receiving a first display data having a first data sequence; rearranging the first display data to generate a second display data according to at least one setting signal; and outputting the second display data to drive the display panel. The second display data has a second data sequence different from the first data sequence.

36 Claims, 26 Drawing Sheets

METHOD FOR DRIVING DISPLAY PANEL AND DRIVER CIRCUIT USING THE SAME

BACKGROUND

Technical Field

The invention relates to a driving method and a driver circuit, more specifically, to a method for driving a display panel and a driver circuit configured to drive a display panel.

Description of Related Art

An electronic device with a display function typically includes a display panel and a driver chip. The driver chip is configured to drive the display panel to display an image. The driver chip is connected to the display panel through a fan-out area to output display data to drive the display panel. In order to reduce the length of the fan-out area between the driver chip and the display panel, extended connecting lines of the display panel may be laid out in the active area of the display panel. However, for the driver chip to drive a display panel with this layout, the sequence of the data outputted to the display panel must be changed so that the display data could properly drive the pixels on the display panel.

SUMMARY

The invention is directed to a method for driving a display panel and a driver circuit, capable of rearranging display data to adaptively drive the display panel having different data line layout.

A method for driving a display panel is provided. The method includes: receiving a first display data having a first data sequence; rearranging the first display data to generate a second display data having a second data sequence according to at least one setting signal; and outputting the second display data to drive the display panel. The second data sequence is different from the first data sequence.

A driver circuit configured to drive a display panel is provided. The driver circuit includes a processing circuit. The processing circuit is configured to receive a first display data having a first data sequence, rearrange the first display data to generate a second display data having a second data sequence according to at least one setting signal, and output the second display data to drive the display panel. The second data sequence is different from the first data sequence.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments could be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" could refer to a current, a voltage, a charge, a temperature, data, electromagnetic wave or any one or multiple signals.

Figure 1:
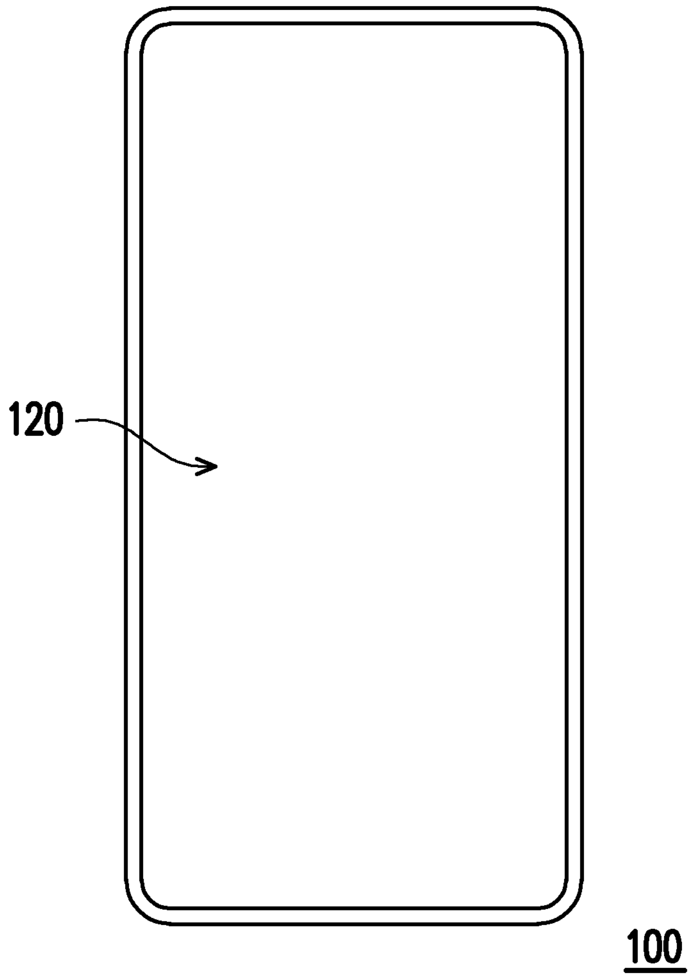
FIG. 1 is a schematic diagram illustrating an electronic device according to an embodiment of the invention.
Figure 2:
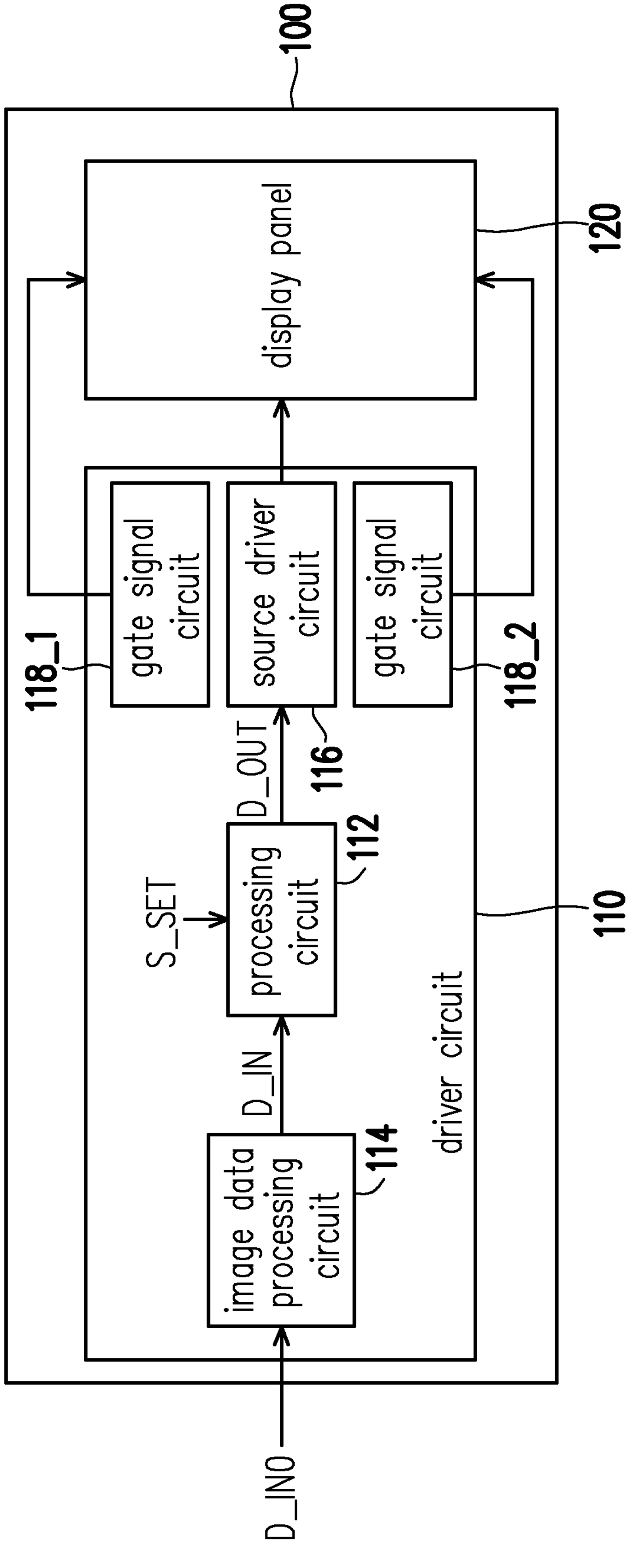
FIG. 2 is a block diagram illustrating the electronic device of FIG. 1 according to an embodiment of the invention.

FIG. 1 is a schematic diagram illustrating an electronic device according to an embodiment of the invention. FIG. 2 is a block diagram illustrating the electronic device of FIG. 1 according to an embodiment of the invention. Referring to FIG. 1 and FIG. 2, the electronic device 100 includes a driver circuit 110 and a display panel 120. The driver circuit 110 is configurable to be coupled to the display panel 120. The display panel 120 may be a self-illuminated display panel, e.g. an organic light-emitting diode (OLED) panel, but the invention is not limited thereto.

The driver circuit 110 is configured to drive the display panel 120 to display images. The driver circuit 110 includes a processing circuit 112, an image data processing circuit 114, a source driver circuit 116, and gate signal circuits 118_1 and 118_2. The image data processing circuit 114 receives image data D_IN0 from a host, e.g. an application processor (AP) of the electronic device 100, and preforms some data processing operations on the image data D_IN0. The image data processing circuit 114 outputs a first display data D_IN to the processing circuit 112. The processing circuit 112 is adapted to perform a data rearrangement operation on the first display data D_IN according to at least one setting signal S_SET. For example, the processing circuit 112 may receive the first display data D_IN and rearrange the first display data D_IN to generate a second display data D_OUT according to the at least one setting signal S_SET. The driver circuit 110 outputs the second display data D_OUT to the source driver circuit 116. The source driver circuit 116 converts the second display data D_OUT of digital format into voltage signals of analog format to drive the display panel 120 to display images. In addition, the gate signal circuits 118_1 and 118_2 may output gate signals to gate circuits on the display panel 120, such that the gate circuits could generate scan signals to drive scan lines of the display panel 120. The number of the gate signal circuits 118_1 and 118_2 does not intend to limit the invention.

Regarding hardware structures of the components in the embodiment of FIG. 2, the processing circuit 112 may be a processor having computational capability. Alternatively, the controller circuit 112 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). In addition, enough teaching, suggestion, and implementation illustration for hardware structures of the processing circuit 112 could be obtained with reference to common knowledge in the related art.

In the present embodiment, the electronic device 100 may be an electronic device having a display function, a touch sensing function and/or a fingerprint sensing function. In an embodiment, the electronic device 100 may be, but not limited to, a smartphone, a non-smart phone, a wearable electronic device, a tablet computer, a personal digital assistant, a notebook and other portable electronic devices that could operate independently and have the display function, the touch sensing function and/or the fingerprint sensing function. In an embodiment, the electronic device 100 may be, but not limited to, a portable or un-portable electronic device in a vehicle intelligent system. In an embodiment, the electronic device 100 may be, but not limited to, intelligent home appliances such as, a television, a computer, a refrigerator, a washing machine, a telephone, an induction cooker, a table lamp and so on.

Figure 3A:
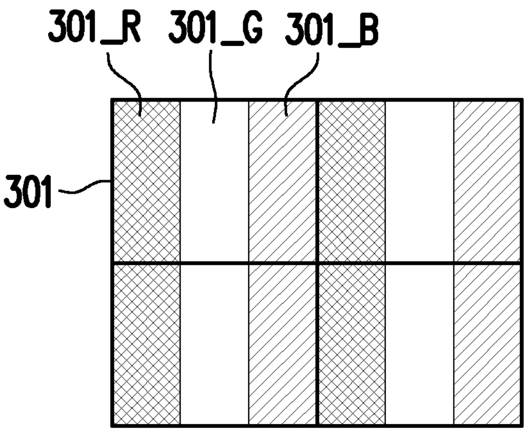
FIG. 3A is a schematic diagram illustrating a pixel layout of the display panel of FIG. 1 according to an embodiment of the invention.

FIG. 3A is a schematic diagram illustrating a pixel layout of the display panel of FIG. 1 according to an embodiment of the invention. Referring to FIG. 3A, the display panel 120 of FIG. 1 may include a plurality of pixels 301. Each of the pixels 301 includes three subpixels of a first color, a second color and a third color, e.g., a green subpixel 301_G, a red subpixel 301_R, and a blue subpixel 301_B.

Figure 3B:
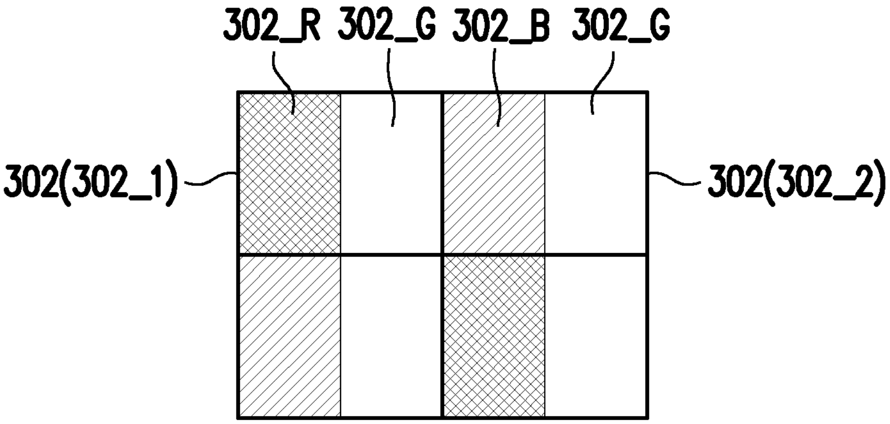
FIG. 3B is a schematic diagram illustrating a pixel layout of the display panel of FIG. 1 according to another embodiment of the invention.

FIG. 3B is a schematic diagram illustrating a pixel layout of the display panel of FIG. 1 according to another embodiment of the invention. Referring to FIG. 3B, the display panel 120 of FIG. 1 may include a plurality of pixels 302. Each of the pixels 302 includes two subpixels. One of the two subpixels is a subpixel of a first color, and the other one of the two subpixels is a subpixel of a second color or a third color. For example, the pixel 302_1 includes a green subpixel 302_G and a red subpixel 302_R, and the pixel 302_2 includes the green subpixel 302_G and a blur subpixel 302_B. The display panel 120 having the pixel layout as depicted in FIG. 3B is a display panel of sub-pixel rendering (SPR). Relatively, the display panel 120 having the pixel layout as depicted in FIG. 3A is a display panel of true RGB.

Figure 4:
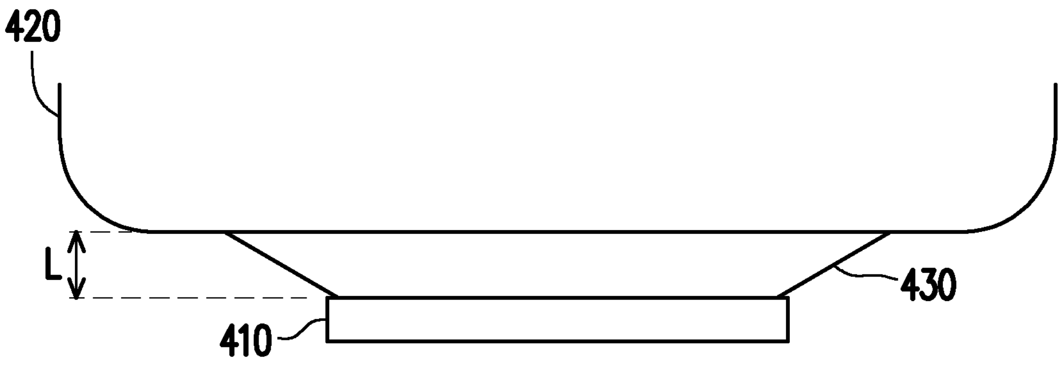
FIG. 4 is a schematic diagram illustrating a fan-out area between a driver circuit and a display panel according to an embodiment of the invention.

FIG. 4 is a schematic diagram illustrating a fan-out area between a driver circuit and a display panel according to an embodiment of the invention. Referring to FIG. 4, in the present embodiment, the driver circuit 410 is connected to the display panel 420 through the fan-out area 430, but the invention is not limited thereto. In an embodiment, an electrostatic discharge (ESD) protection circuit and a bending area may be disposed between the driver circuit 410 and the display panel 420.

In order to reduce a length L of the fan-out area 430, a layout of data lines of the display panel 420 may be implemented in a manner of fan-out in active area (FIAA). In the present embodiment, FIAA layout is adopted for data lines, and thus the length L of the fan-out area 430 of FIG. 4 is smaller than that of the display panel without FIAA layout.

Figure 5:
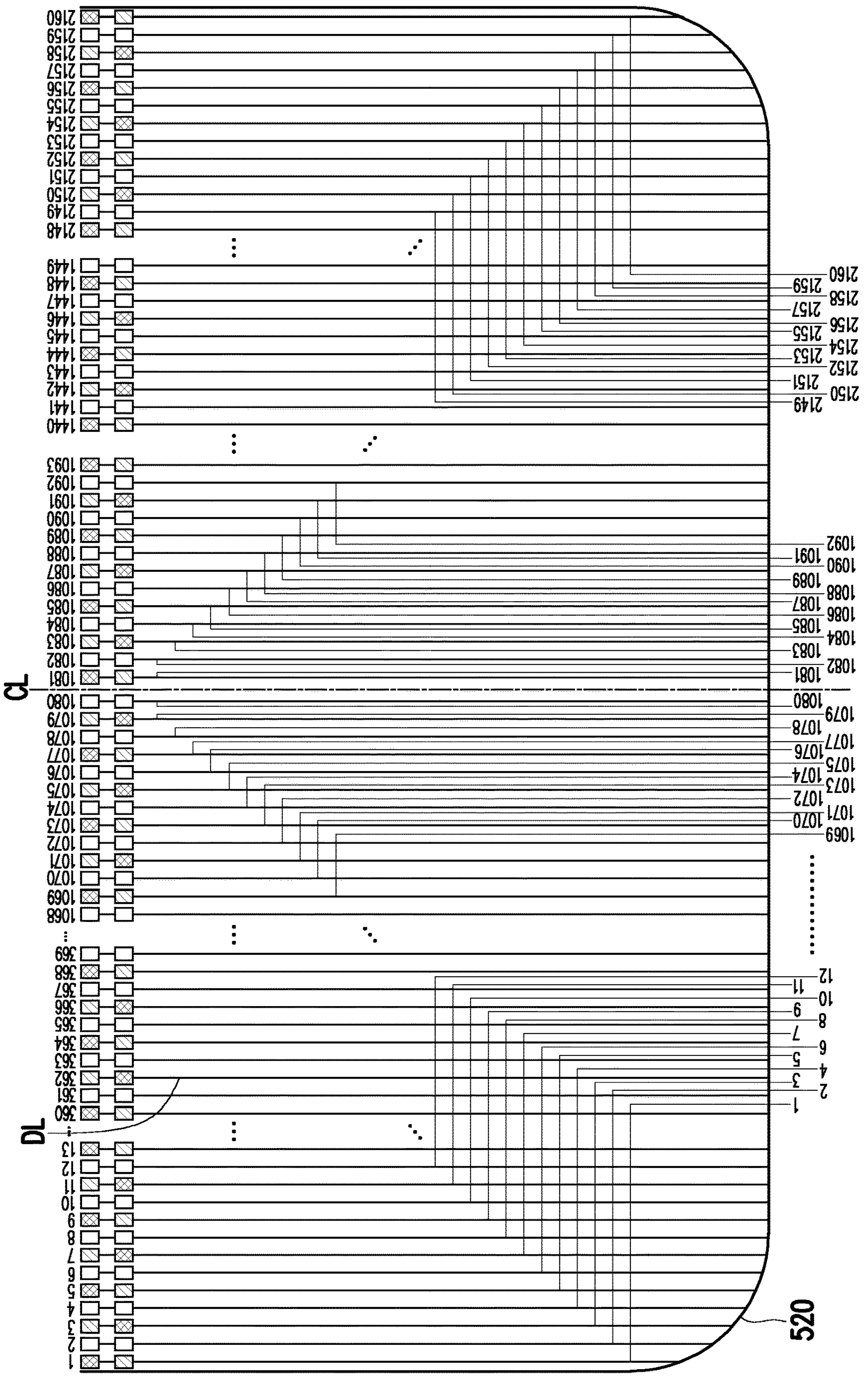
FIG. 5 is a schematic diagram illustrating a layout of data lines of a display panel according to an embodiment of the invention.

FIG. 5 is a schematic diagram illustrating a layout of data lines of a display panel according to an embodiment of the invention. Referring to FIG. 5, taking 2160 data lines for example, the display panel 520 may include 2160 data lines, but the invention is not limited thereto. In FIG. 5, FIAA layout is adopted for data lines DL to reduce the length L of the fan-out area 130. The data line layout is symmetrical to a reference line CL located in a center region of the display panel 520. In the present embodiment, pin numbers 1 to 2160 of the display panel 520 are arranged in a normal sequence. For example, the pin numbers 1 to 2160 are arranged from left to right in a positive sequence.

Figure 6:
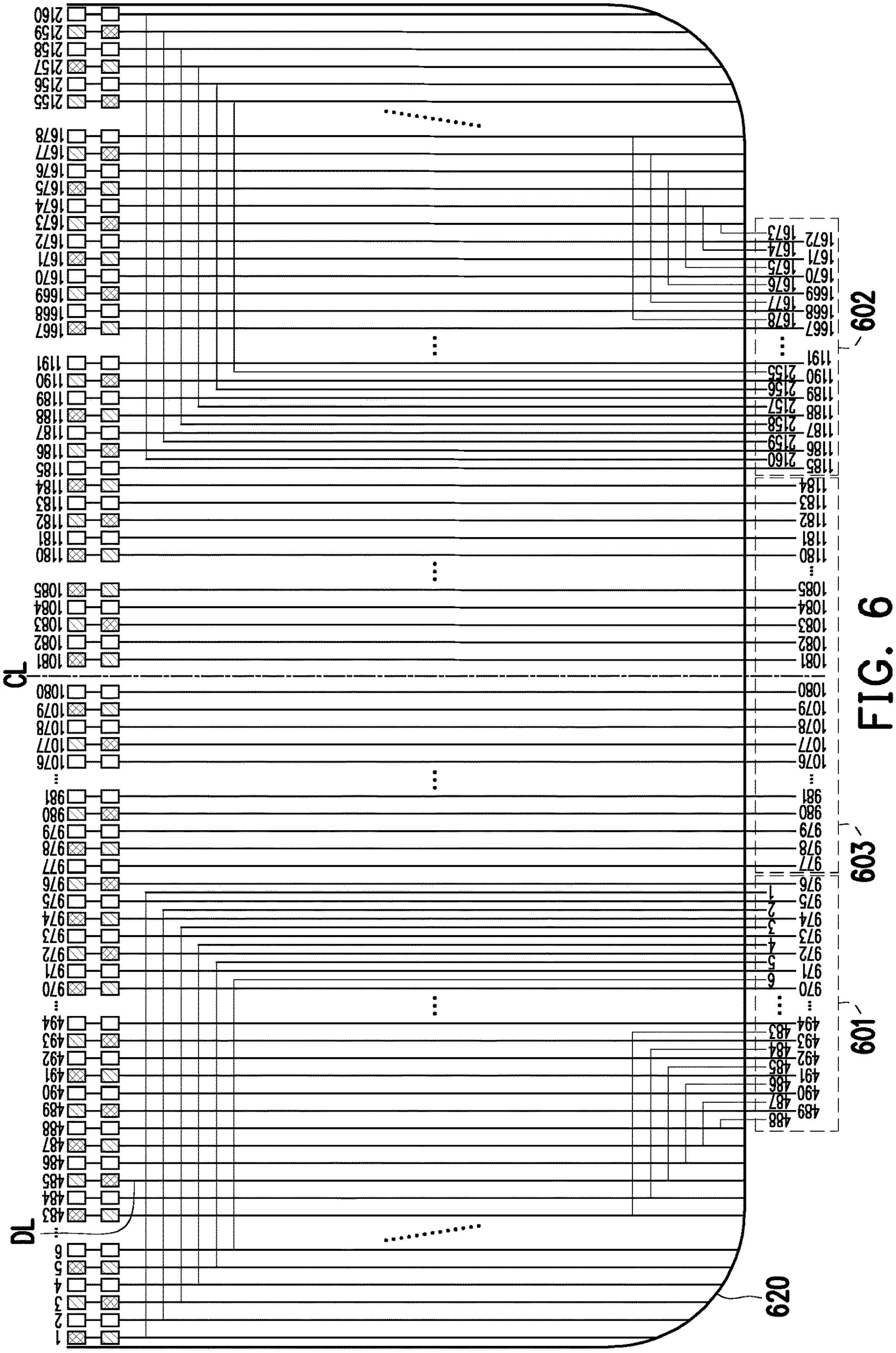
FIG. 6 is a schematic diagram illustrating a layout of data lines of a display panel according to another embodiment of the invention.

FIG. 6 is a schematic diagram illustrating a layout of data lines of a display panel according to another embodiment of the invention. Referring to FIG. 6, taking 2160 data lines for example again, the display panel 620 may also include 2160 data lines, but the invention is not limited thereto. In FIG. 6, FIAA layout is adopted for some data lines DL to reduce the length L of the fan-out area 430. The data line layout is symmetrical to the reference line CL located in a center region of the display panel 620.

In the present embodiment, some pin numbers of the display panel 620 are interlaced due to FIAA layout. For example, in the dotted block 601, the pin numbers 488 to 1 and the pin numbers 489 to 976 are interlaced. The pin numbers 488 to 1 are arranged from left to right in a negative sequence, and the pin numbers 489 to 976 are arranged from left to right in the positive sequence, wherein the negative sequence is an inverse sequence of the positive sequence. The negative sequence is the decreasing sequence of numbers in a predetermined direction, and the positive sequence is the increasing sequence of numbers in the same direction. In the present embodiment, the predetermined direction is from left to right. On the other hand, in the dotted block 602, the pin numbers 2160 to 1673 and the pin numbers 1185 to 1672 are interlaced. The pin numbers 2160 to 1673 are arranged from left to right in the negative sequence, and the pin numbers 1185 to 1672 are arranged from left to right in the positive sequence. In addition, in the dotted block 603, the pin numbers 977 to 1184 are arranged from left to right in the positive sequence.

Figure 7:
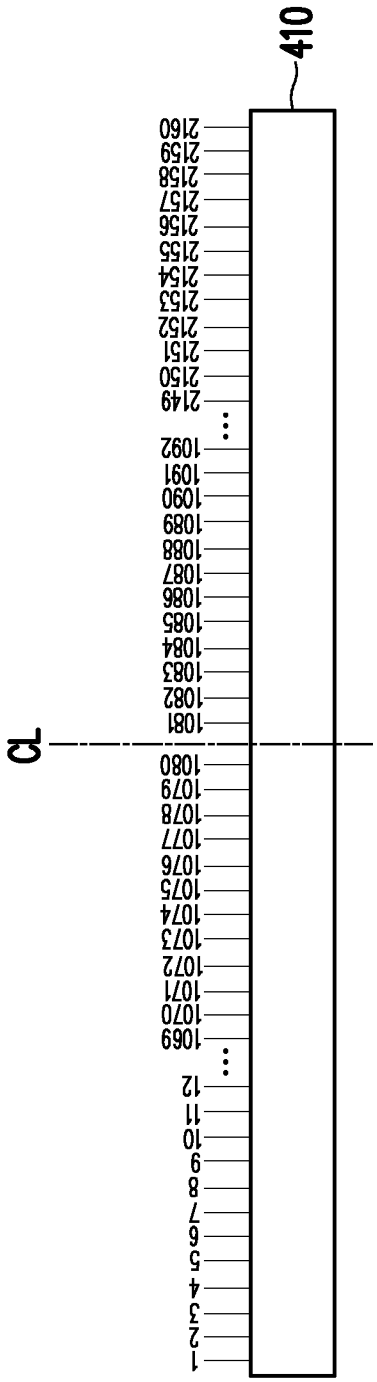
FIG. 7 is a schematic diagram illustrating pin arrangement of a driver circuit according to an embodiment of the invention.

In the embodiment of FIG. 6, due to FIAA layout, the pin numbers of the display panel 620 in the dotted blocks 601 and 603 are interlaced. FIG. 7 is a schematic diagram illustrating pin arrangement of a driver circuit according to an embodiment of the invention. Referring to FIG. 6 and FIG. 7, in the present embodiment, since the pin numbers 1 to 2160 of the driver circuit 110 are arranged from left to right in the positive sequence, when the driver circuit 110 is coupled to the display panel 120 and configured to drive the display panel 120, it is required to rearrange a data sequence of the display data outputted from the driver circuit 110 to adaptively drive the display panel 620.

Figure 8:
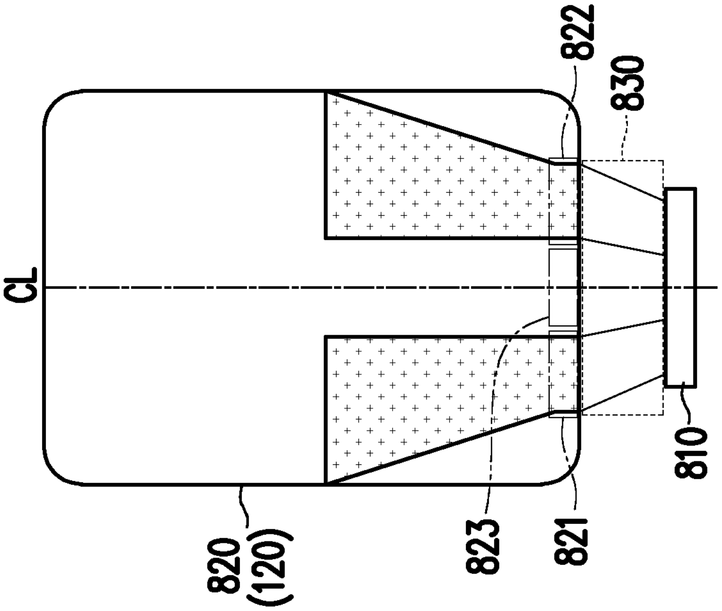
FIG. 8 is a schematic diagram illustrating an electronic device according to another embodiment of the invention.

FIG. 8 is a schematic diagram illustrating an electronic device according to another embodiment of the invention. Referring to FIG. 8, the driver circuit 810 is connected to the display panel 820 through the fan-out area 830. The display panel 820 could be a small or medium size panel, and the driver circuit 810 is implemented as a single chip integrated circuit that could drive and control the display panel 820. FIAA layout is adopted for some data lines of the display panel 820.

To be specific, the display panel 820 includes a first edge region 821, a second edge region 822, and a center region 823, wherein the first edge region 821 and the second edge region 822 are located at two opposite sides of the center region 823. FIAA layout is adopted for the data lines corresponding to the first edge region 821 and the second edge region 822 of the display panel 820. It is required to rearrange the data sequence of the display data outputted to data lines corresponding to the first edge region 821 and the second edge region 822 to adaptively drive the display panel 820. The data rearrangement operation performed on the display data outputted to data lines corresponding to the first edge region 821 and the second edge region 822 could be separately set and independently performed by the single chip integrated circuit 810.

Figure 9:
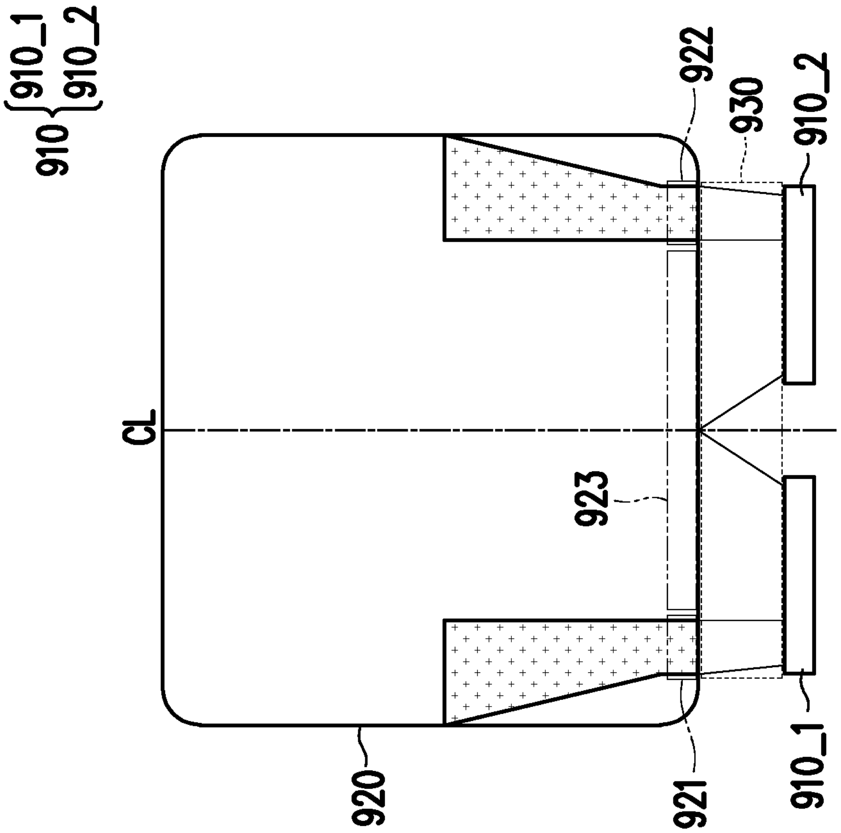
FIG. 9 is a schematic diagram illustrating an electronic device according to another embodiment of the invention.

FIG. 9 is a schematic diagram illustrating an electronic device according to another embodiment of the invention. Referring to FIG. 9, the driver circuit 910 is connected to the display panel 920 through the fan-out area 930. The display panel 920 could be a large size panel, and the driver circuit 910 is implemented as two separate chip integrated circuits 910_1 and 910_2 that could drive and control the display panel 920. FIAA layout is adopted for some data lines of the display panel 920.

Similarly, FIAA layout is adopted for the data lines corresponding to the first edge region 921 and the second edge region 922 of the display panel 920, wherein the first edge region 921 and the second edge region 922 are located at two opposite sides of the center region 923. It is also required to rearrange the data sequence of the display data outputted to data lines corresponding to the first edge region 921 and the second edge region 922 to adaptively drive the display panel 920. The data rearrangement operation performed on the display data outputted to data lines corresponding to the first edge region 921 and the second edge region 922 could be separately set and independently performed by the chip integrated circuits 910_1 and 910_2.

Some embodiments of data rearrangement will be described in the following description, and it should be noted that the described embodiments are not limited to the FIAA layout and the interlaced sequence depicted in FIG. 6.

Figure 10:
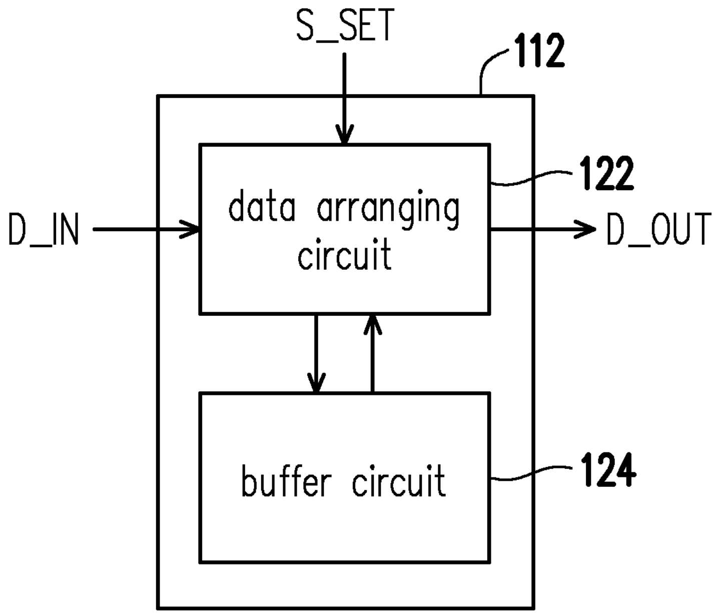
FIG. 10 is a block diagram illustrating the driver circuit of FIG. 1 according to an embodiment of the invention.
Figure 11:
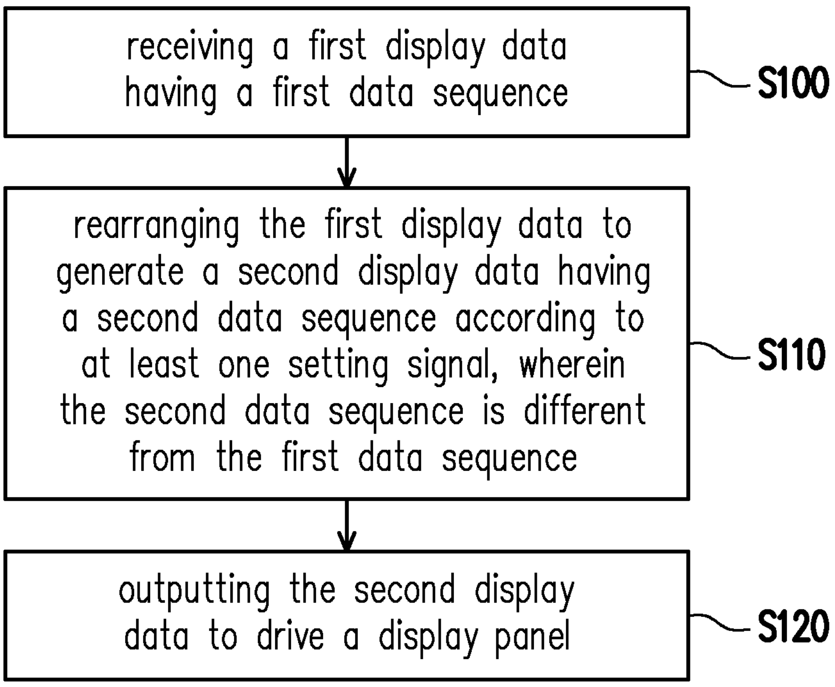
FIG. 11 is a flowchart illustrating a method for driving a display panel according to an embodiment of the invention.
Figure 12:
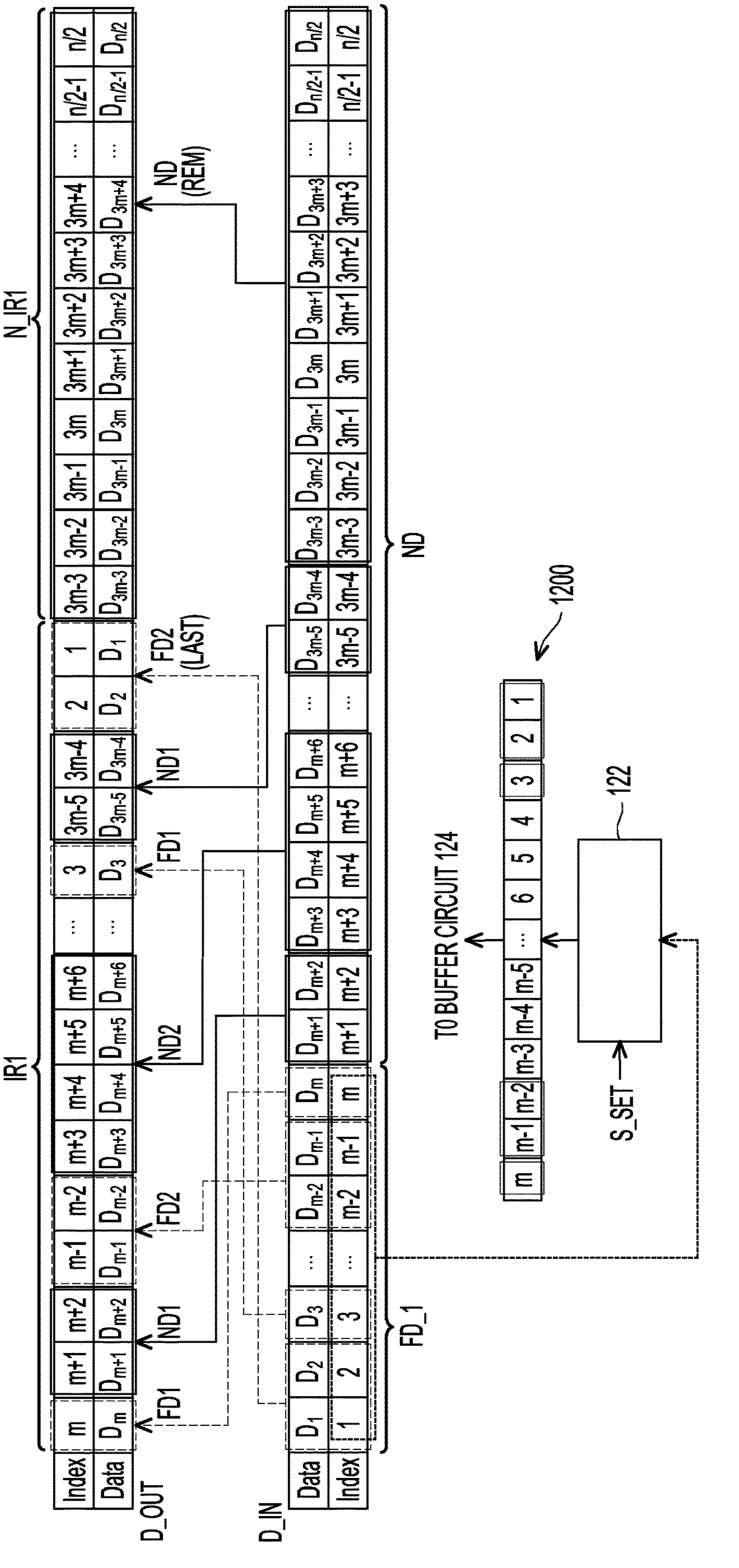
FIG. 12 is a schematic diagram illustrating data rearrangement according to an embodiment of the invention.

FIG. 10 is a block diagram illustrating the driver circuit of FIG. 1 according to an embodiment of the invention. FIG. 11 is a flowchart illustrating a method for driving a display panel according to an embodiment of the invention. FIG. 12 is a schematic diagram illustrating data rearrangement according to an embodiment of the invention. Referring to FIG. 10 to FIG. 12, the method for driving the display panel is at least adapted to the electronic device 100 depicted in FIG. 1 and FIG. 2, but the invention is not limited thereto. In FIG. 12, data indexes of the first display data D_IN and the second display data D_OUT are also illustrated.

In FIG. 10, the processing circuit 112 includes a data arranging circuit 122 and a buffer circuit 124. The data arranging circuit 122 is coupled to the buffer circuit 124. The buffer circuit 124 may be disposed in the processing circuit 112 or outside of the processing circuit 112, and the invention does not intend to limit the location of the buffer circuit 124. Implementation for the structures of the data arranging circuit 122 and the buffer circuit 124 could be obtained, taught and suggested with reference to common knowledge in the related art.

The data arranging circuit 122 is configured to perform the data rearrangement operation on the first display data D_IN. For example, the data arranging circuit 122 may rearrange the data indexes of the first display data D_IN, and store the rearranged data index 1200 to the buffer circuit 124. The buffer circuit 124 is configured to store the rearranged data indexes 1200. The processing circuit 112 could generate the second display data D_OUT according to the rearranged data indexes 1200 stored in the buffer circuit 124.

To be specific, taking the electronic device 100 for example, in step S100, the processing circuit 112 receives the first display data D_IN having a first data sequence as illustrated in FIG. 12 via the data arranging circuit 122. The first display data D_IN may include n data, wherein n is an even number larger than 2. For clarity and conciseness, only n/2 data, i.e. a half of the whole data, are illustrated in FIG. 12. The n/2 data of the first display data D_IN are arranged in the first data sequence as illustrated in FIG. 12. For example, the first data sequence is the normal sequence, and the original sequence of the first display data D_IN is the normal sequence.

In step S110, the processing circuit 112 rearranges the first display data D_IN to generate the second display data D_OUT having a second data sequence via the data arranging circuit 122 according to the at least one setting signal S_SET, wherein the second data sequence is different from the first data sequence, as illustrated in FIG. 10. The at least one setting signal S_SET may include panel information, such that the rearranged second display data D_OUT could adaptively drive the display panel 120, which has a specified FIAA layout. In the present embodiment, the data arranging circuit 122 rearranges the data indexes of the first display data D_IN, and stores the rearranged data indexes 1200 to the buffer circuit 124.

In step S120, the processing circuit 112 outputs the second display data D_OUT to drive the display panel 120. In an embodiment, the processing circuit 112 may access the rearranged data indexes 1200 stored in the buffer circuit 124, and generate and output the second display data D_OUT according to the stored data indexes 1200.

In FIG. 12, the first display data D_IN includes a first part FD_1 and a third part ND. The first part FD_1 of the first display data D_IN is configured to drive data lines located in the first edge region 821 of the display panel 120. The third part ND of the first display data D_IN is configured to drive data lines located in the center region 823 of the display panel 120.

The data sequence of the first part FD_1 is rearranged according to the at least one setting signal S_SET. The first part FD_1 of the first display data D_IN is arranged from the first edge region 821 to the center region 823 of the display panel 120 in the negative sequence after rearrangement. For example, in the rearranged data indexes 1200, the data indexes m to 1 of the first part FD_1 is rearranged from left to right in the negative sequence, wherein m is an integer, and $1<m<n/2$.

The data sequence of the third part ND is maintained unchanged according to the at least one setting signal S_SET. The third part ND of the first display data D_IN is maintained in the positive sequence from left to right of the display panel 120. For example, the data indexes m+1 to n/2 of the third part ND is maintained as the positive sequence after rearrangement.

On the other hand, the first part FD and some data of the third part ND are interlaced in the second display data D_OUT. The region IR1 is an interlaced region, and the region NIR1 is a non-interlaced region. To be specific, the first part FD_1 of the first display data D_IN includes a plurality of first data units FD1 and FD2, and the third part ND of the first display data D_IN includes a plurality of third data units ND1 and ND2. The first data units FD1 and FD2 are interlaced with the third data units ND1 and ND2.

In the present embodiment, the first data units FD1 include one data $D_m$ or $D_3$, and the first data units FD2 include two data $D_{m-1}$ and $D_{m-2}$ or $D_2$ and $D_1$. The first data units FD1 and FD2 include different numbers of data, but the invention is not limited thereto. In an embodiment, the first data units may include the same number of data. In an embodiment, each of the first data units may include different number of data.

In the present embodiment, the third data units ND1 include two data $D_{m+1}$ and $D_{m+2}$ or $D_{3m-5}$ and $D_{3m-4}$, and the third data units ND2 include four data $D_{m+3}$, $D_{m+4}$, $D_{m+5}$, and $D_{m+6}$. The third data units ND1 and ND2 include different numbers of data, but the invention is not limited thereto. In an embodiment, the third data units may include the same number of data. In an embodiment, each of the third data units may include different number of data.

In addition, the first display data D_IN further includes a second part. The second part of the first display data D_IN is configured to drive data lines located in the second edge region 822 of the display panel 120. For clarity and conciseness, only the first part and some of the third part, i.e. n/2 data, are illustrated in FIG. 12. The data sequence of the second part is also rearranged according to the at least one setting signal S_SET. The second part of the first display data D_IN is arranged from the center region 823 to the second edge region 822 of the display panel 120 in the negative sequence after rearrangement. The second part of the first display data D_IN includes a plurality of second data units, and the second data units are also interlaced with the third data units. The second data units include different numbers of data, but the invention is not limited thereto. In an embodiment, the second data units may include the same number of data. In an embodiment, each of the second data units may include different number of data.

In an embodiment, the second display data D_OUT may include 2160 data, i.e. n=2160 and n/2=1080, and the first part FD_1 may include 488 data, i.e. m=488, and the second part (not shown) may also include 488 data, wherein n/2 and m are the data indexes of $D_{n/2}$ and $D_m$.

The data rearrangement operation performed on the second part of the first display data D_IN could be deduced by referring to FIG. 12, and more details will be described later.

Figure 13:
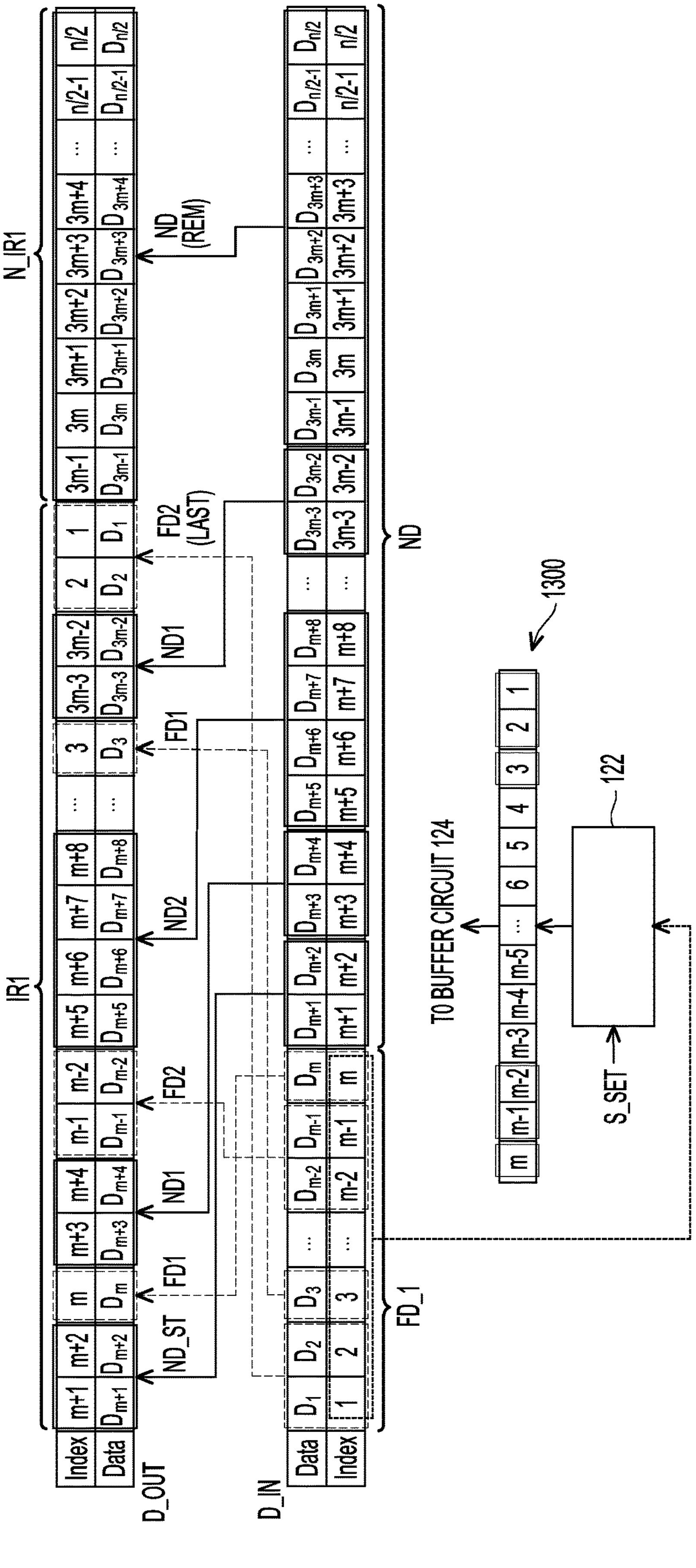
FIG. 13 is a schematic diagram illustrating data rearrangement according to another embodiment of the invention.

FIG. 13 is a schematic diagram illustrating data rearrangement according to another embodiment of the invention. Referring to FIG. 12 to FIG. 13, in the embodiment of FIG. 12, the starting data unit of the second display data D_OUT is the first data unit FD1 including the data $D_m$, but the invention is not limited thereto. In the embodiment of FIG. 13, the starting data unit of the second display data D_OUT is the third data unit ND1 including the data $D_{m+1}$ and $D_{m+2}$.

To be specific, after the data rearrangement operation of FIG. 12 is completed, the processing circuit 112 could further shift the third part ND relative to the first part FD_1 according to the at least one setting signal S_SET. For example, the third part ND is shifted relative to the first part FD_1, such that the third data unit ND1 including the data $D_{m+1}$ and $D_{m+2}$ of FIG. 12 are rearranged to left of the first data unit FD1 including the data $D_m$, and the shifted third data unit is marked as ND_ST in FIG. 13. Other third data units ND1 and ND2 are also shifted relative to corresponding the first data units FD1 and FD2. Accordingly, the starting data unit of the second display data D_OUT is the third data unit ND1 including the data $D_{m+1}$ and $D_{m+2}$ in FIG. 13.

Therefore, in the present embodiment, the data rearrangement operation includes the data shift operation to flexibly adjust the first display data D_IN to match more panel layout requirements.

Figure 14A:
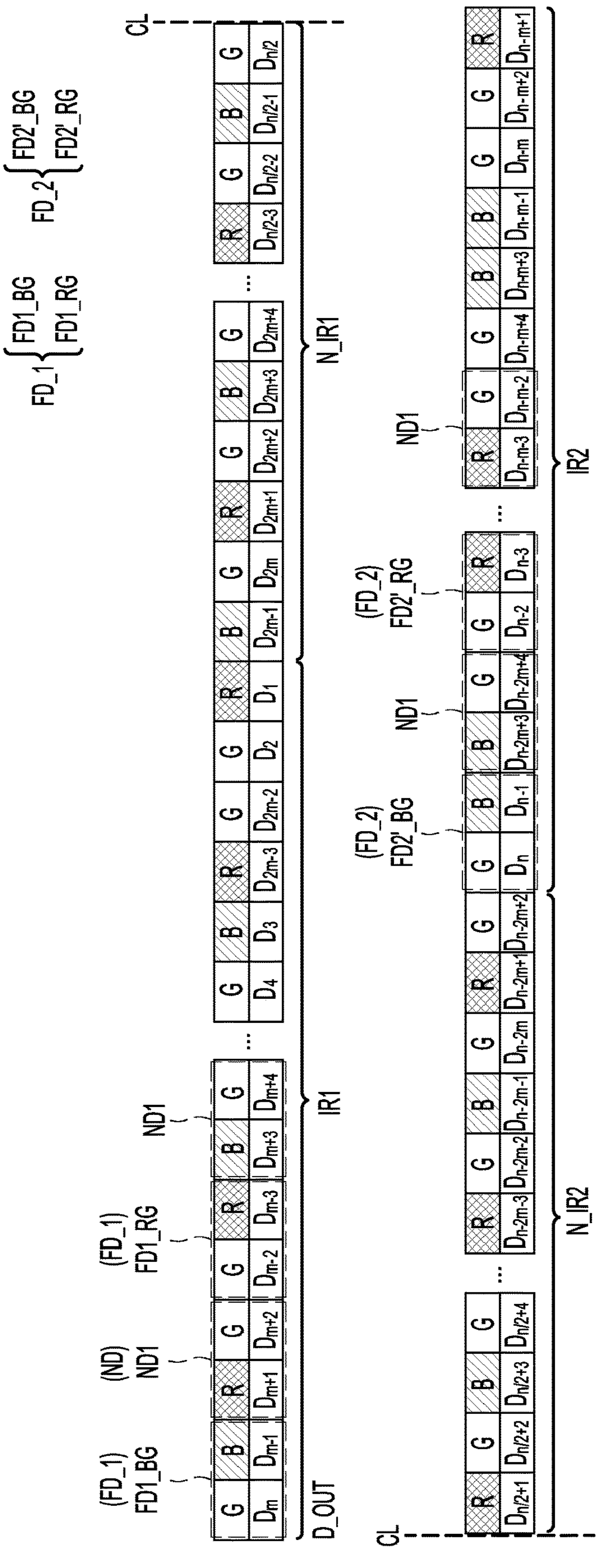
FIG. 14A is a schematic diagram illustrating a rearranged display data according to an embodiment of the invention.

FIG. 14A is a schematic diagram illustrating a rearranged display data according to an embodiment of the invention. Referring to FIG. 14A, the second display data D_OUT is a rearranged display data. The second display data D_OUT is configured to drive a SPR display panel, and subpixel colors R, G and B that the second display data D_OUT drives are also illustrated in FIG. 14A.

The second display data D_OUT includes interlaced regions IR1 and IR2 and non-interlaced regions NIR1 and NIR2. Taking FIG. 8 for example, the second display data D_OUT of the interlaced regions IR1 and IR2 are respectively configured to drive data lines located in the first edge region 821 and the second edge region 822, and the second display data D_OUT of the non-interlaced regions NIR1 and NIR2 are configured to drive data lines located in the center region 823.

The second display data D_OUT includes a first part FD_1, a second part FD_2 and a third part ND. The first part FD_1 includes a plurality of first data units FD1_BG and FD1_RG. The second part FD_2 includes a plurality of second data units FD3_BG and FD3_RG. The third part ND includes a plurality of third data units ND1. Each of the first data units FD1_BG and FD1_RG, the second data units FD3_BG and FD3_RG, and the third data units ND1 is set to have the same number of data, e.g. two data. The first data units FD1_BG and FD1_RG and the third data units ND1 are interlaced in the interlaced region IR1. The second data units FD3_BG and FD3_RG and the third data units ND1 are interlaced in the interlaced region IR2.

In an embodiment, the interlaced region IR1 may simply include the first data units FD1_BG and FD1_RG, and the interlaced region IR2 may simply include the second data units FD3_BG and FD3_RG. That is, the first data units FD1_BG and FD1_RG, the second data units FD3_BG and FD3_RG and the third data units ND1 are not interlaced.

In the present embodiment, each of the first data units FD1_BG and FD1_RG, the second data units FD3_BG and FD3_RG, and the third data units ND1 is set to have two data, but the invention is not limited thereto. In an embodiment, the number of data of each of the first data units FD1_BG and FD1_RG, the second data units FD3_BG and FD3_RG, and the third data units ND1 may be set as one data. In an embodiment, the number of data of each of the first data units FD1_BG and FD1_RG and the second data units FD3_BG and FD3_RG may be set as two data, and the number of data of each of the third data units ND1 may be set as four data.

For the first part FD_1 of the second display data D_OUT, the first part FD_1 is rearranged from the first edge region 821 to the center region 823 of the display panel 120 in the negative sequence. For example, the first data unit FD1_BG is rearranged to include data $D_m$ and $D_{m-1}$, and the first data unit FD1_RG is rearranged to include $D_{m-2}$ and $D_{m-3}$.

For the second part FD_2 of the second display data D_OUT, the second part FD_2 is rearranged from the center region 823 to the second edge region 822 of the display panel 120 in the negative sequence. For example, the second data unit FD3_BG is rearranged to include data $D_n$ and $D_{n-1}$, and the second data unit FD3_RG is rearranged to include data $D_{n-2}$ and $D_{n-3}$.

In an embodiment, the second display data D_OUT may include 2160 data, i.e. n=2160, and the first part FD_1 may include 488 data, i.e. m=488, and the second part FD_2 may also include 488 data, i.e. n-m+1=1673, wherein n, m and n-m+1 are the data indexes of $D_n$, $D_m$, and $D_{n-m+1}$.

Figure 14B:
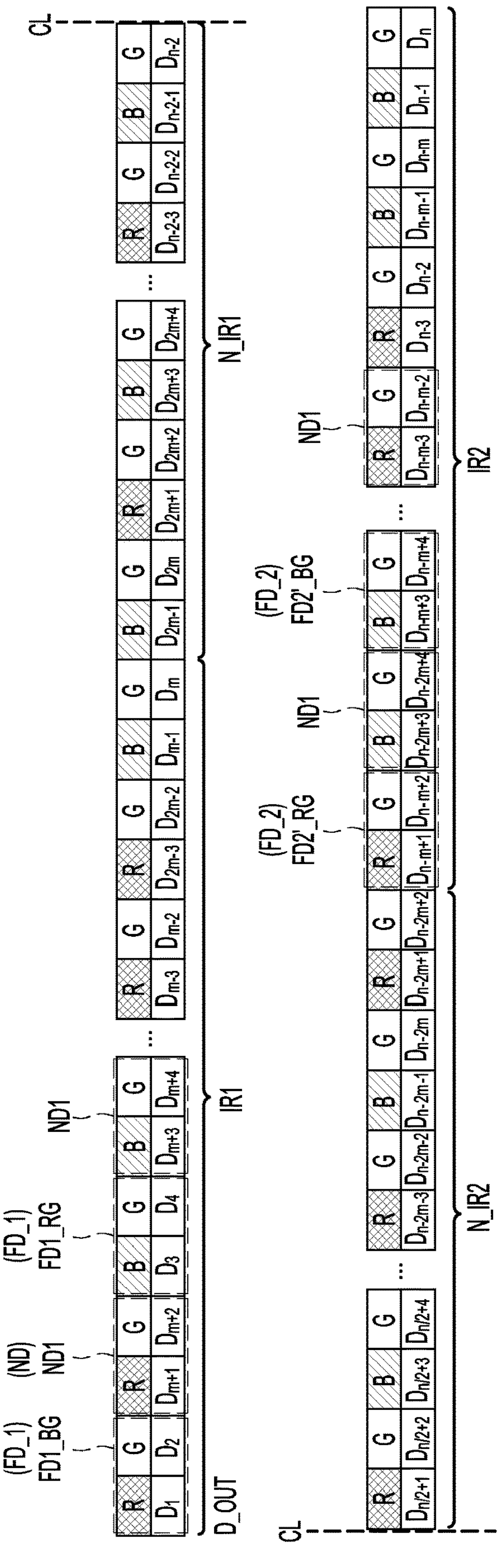
FIG. 14B is a schematic diagram illustrating a rearranged display data according to an embodiment of the invention.

FIG. 14B is a schematic diagram illustrating a rearranged display data according to an embodiment of the invention. Referring to FIG. 14B, the second display data D_OUT is also configured to drive the SPR display panel, and the first part FD_1 and the second part FD_2 of the second display data D_OUT is rearranged in a positive sequence.

To be specific, for the first part FD_1 of the second display data D_OUT, the first part FD_1 is rearranged from the first edge region 821 to the center region 823 of the display panel 120 in the positive sequence. For example, the first data unit FD1_RG is rearranged to include data $D_1$ and $D_2$, and the first data unit FD1_BG is rearranged to include $D_3$ and $D_4$.

For the second part FD_2 of the second display data D_OUT, the second part FD_2 is rearranged from the center region 823 to the second edge region 822 of the display panel 120 in the positive sequence. For example, the second data unit FD3_RG is rearranged to include data $D_{n-m+1}$ and $D_{n-m+2}$, and the second data unit FD3_BG is rearranged to include data $D_{n-m+3}$ and $D_{n-m+4}$.

Therefore, in the embodiment of FIG. 14A and FIG. 14B, the data rearrangement operation includes arrangement in the negative sequence or in the positive sequence to flexibly adjust the first display data D_IN to obtain the second display data D_OUT to match more panel layout requirements and reduce the impact on panel manufacturing process.

Figure 14C:
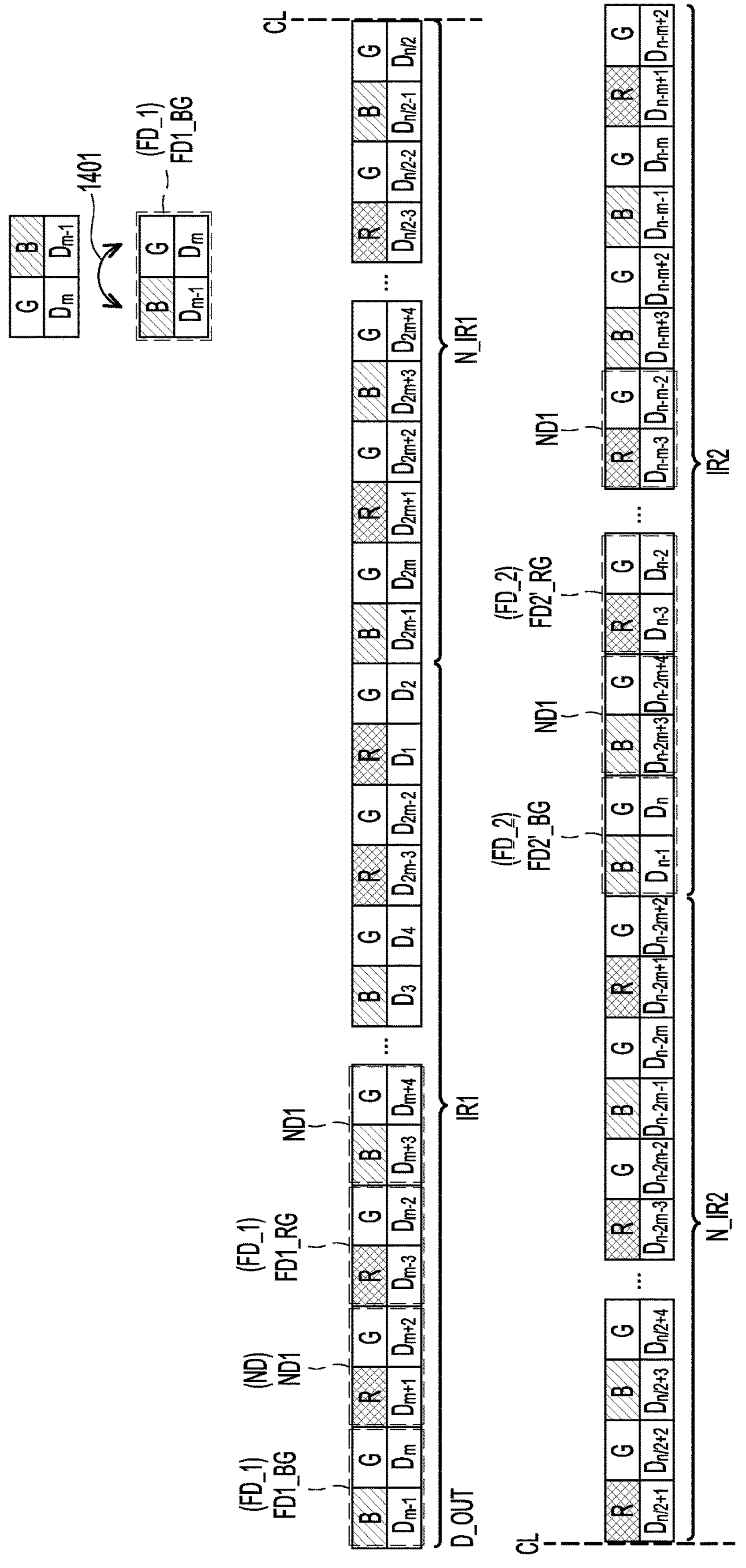
FIG. 14C is a schematic diagram illustrating a rearranged display data according to an embodiment of the invention.

FIG. 14C is a schematic diagram illustrating a rearranged display data according to an embodiment of the invention. Referring to FIG. 14C, the second display data D_OUT is also configured to drive the SPR display panel, and the data lines connected to the subpixel colors R and B may be routing in an identical metal layer, and the data lines connected to the subpixel color G may be routing in another metal layer different from the identical metal layer. For example, the data lines, i.e. connecting lines, located in the fan-out area 830 may be laid out in different metal layers based on the transmission data is even or odd. The odd data is used to drive the subpixel colors R and B, and corresponding data lines are routing in the identical metal layer. The even data is used to drive the subpixel color G, and corresponding data lines are routing in the another metal layer. In another embodiment, the odd data may be used to drive the subpixel color G, and the even data may be used to drive the subpixel colors R and B.

In the present embodiment, the data rearrangement operation includes a data swapping operation 1401. To be specific, for the first part FD_1 of the second display data D_OUT, the first part FD_1 is firstly rearranged from the first edge region 821 to the center region 823 of the display panel 120 in the negative sequence, and next, the processing circuit 112 could further swap a data sequence of each of the first data units FD1_BG and FD1_RG according to the at least one setting signal S_SET. That is, the data sequence of each of the first data units FD1_BG and FD1_RG could be swapped in a manner of subpixel base. For example, the first data unit FD1_BG is swapped from $D_m$ and $D_{m-1}$ to $D_{m-1}$ and $D_m$, and the first data unit FD1_RG is swapped from $D_{m-2}$ and $D_{m-3}$ to $D_{m-3}$ and $D_{m-2}$.

For the second part FD_2 of the second display data D_OUT, the second part FD_2 is firstly rearranged from the center region 823 to the second edge region 822 of the display panel 120 in the negative sequence, and next, the processing circuit 112 could further swap a data sequence of each of the second data units FD3_BG and FD3_RG according to the at least one setting signal S_SET. That is, the data sequence of each of the second data units FD3_BG and FD3_RG could be swapped in the manner of subpixel base. For example, the second data unit FD3_BG is swapped from $D_n$ and $D_{n-1}$ to $D_{n-1}$ and $D_n$, and the second data unit FD3_RG is swapped from $D_{n-2}$ and $D_{n-3}$ to $D_{n-3}$ and $D_{n-2}$.

Therefore, in the present embodiment, the data rearrangement operation includes the data swapping operation performed in the manner of subpixel base to flexibly adjust the first display data D_IN to obtain the second display data D_OUT to match more panel layout requirements and reduce the impact on panel manufacturing process.

Figure 15:
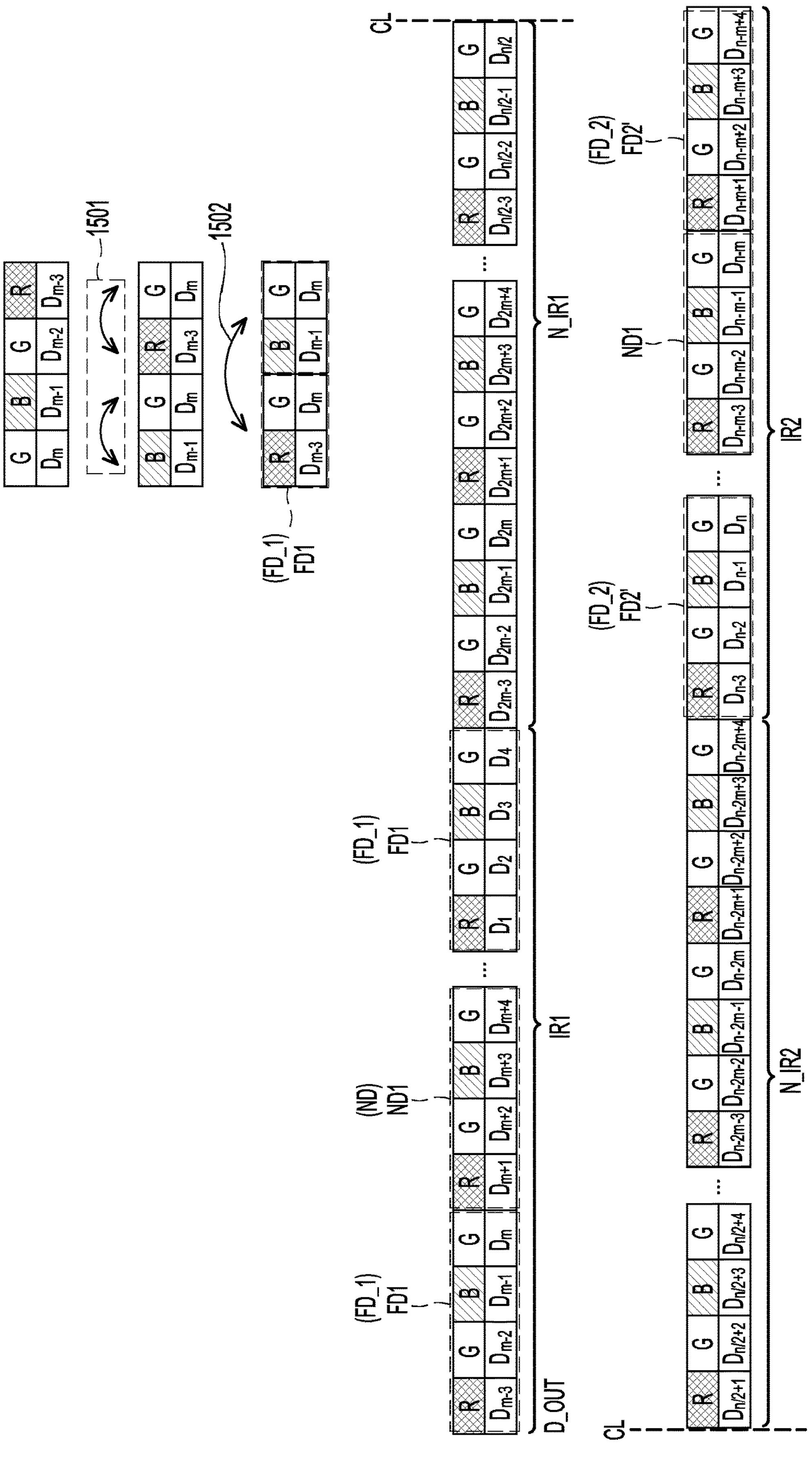
FIG. 15 is a schematic diagram illustrating a rearranged display data according to another embodiment of the invention.

FIG. 15 is a schematic diagram illustrating a rearranged display data according to another embodiment of the invention. Referring to FIG. 15, the second display data D_OUT is also configured to drive the SPR display panel, and the data lines connected to the subpixel colors R and B may be routing in an identical metal layer, and the data lines connected to the subpixel color G may be routing in another metal layer different from the identical metal layer. Each of the first data units FD1, the second data units FD3, and the third data units ND1 is set to have the same number of data, e.g. four data. The first data units FD1 and the third data units ND1 are interlaced in the interlaced region IR1. The second data units FD3 and the third data units ND1 are interlaced in the interlaced region IR2.

In the present embodiment, the data swapping operation 1501 and 1502 is performed in the manner of subpixel base as well as pixel base. For the first part FD_1 of the second display data D_OUT, the first part FD_1 is firstly rearranged from the first edge region 821 to the center region 823 of the display panel 120 in the negative sequence, and next, the processing circuit 112 could further swap a data sequence of each of the first data units FD1 according to the at least one setting signal S_SET. That is, the data sequence of each of the first data units FD1 can be swapped in the manner of subpixel base as well as pixel base. For example, the left first data unit FD1 is swapped from $D_m$, $D_{m-1}$, $D_{m-2}$ and $D_{m-3}$ to $D_{m-1}$, $D_m$, $D_{m-3}$ and $D_{m-2}$ in the manner of subpixel base, and then further swapped from $D_{m-1}$, $D_m$, $D_{m-3}$ and $D_{m-2}$ to $D_{m-3}$, $D_{m-2}$, $D_{m-1}$ and $D_m$ in the manner of pixel base.

For the second part FD_2 of the second display data D_OUT, the second part FD_2 is firstly rearranged from the center region 823 to the second edge region 822 of the display panel 120 in the negative sequence, and next, the processing circuit 112 could further swap a data sequence of each of the second data units FD3 according to the at least one setting signal S_SET. That is, the data sequence of each of the second data units FD3 could be swapped in the manner of subpixel base as well as pixel base. For example, the left second data unit FD3 is swapped from $D_n$, $D_{n-1}$, $D_{n-2}$ and $D_{n-3}$ to $D_{n-1}$, $D_n$, $D_{n-3}$ and $D_{n-2}$ in the manner of subpixel base, and then further swapped from $D_{n-1}$, $D_n$, $D_{n-3}$ and $D_{n-2}$ to $D_{n-3}$, $D_{n-2}$, $D_{n-1}$ and $D_n$ in the manner of pixel base.

Therefore, in the present embodiment, the data rearrangement operation includes the data swapping operation performed in the manner of subpixel base as well as pixel base to flexibly adjust the first display data D_IN to obtain the second display data D_OUT to match more panel layout requirements and reduce the impact on panel manufacturing process.

Figure 16:
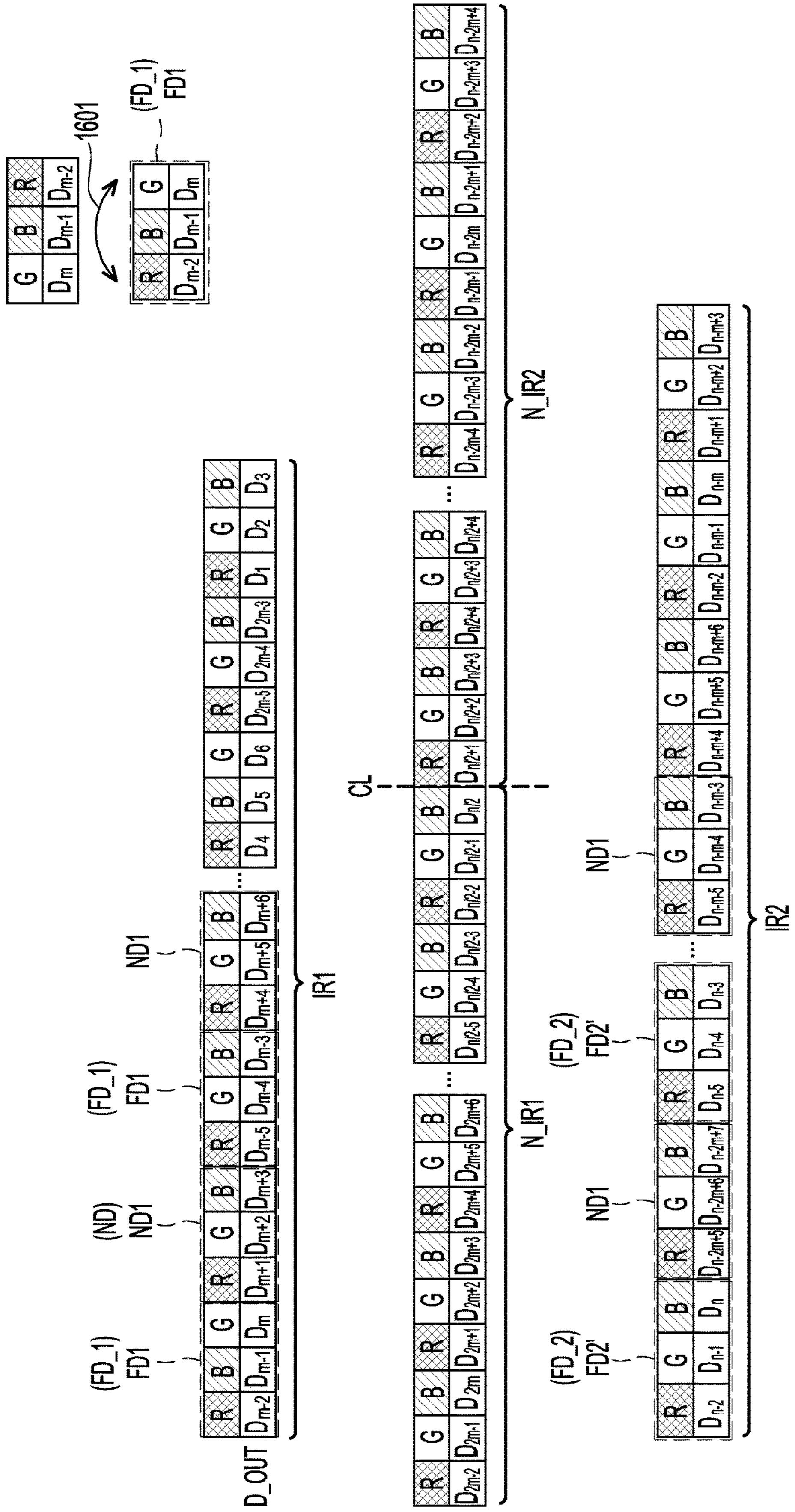
FIG. 16 is a schematic diagram illustrating a rearranged display data according to another embodiment of the invention.

FIG. 16 is a schematic diagram illustrating a rearranged display data according to another embodiment of the invention. Referring to FIG. 16, the second display data D_OUT is configured to drive a display panel of true RGB. Each of the first data units FD1, the second data units FD3, and the third data units ND1 is set to have the same number of data, e.g. three data. The first data units FD1 and the third data units ND1 are interlaced in the interlaced region IR1. The second data units FD3 and the third data units ND1 are interlaced in the interlaced region IR2.

In the present embodiment, the data swapping operation 1601 is performed in the manner of subpixel base. For the first part FD_1 of the second display data D_OUT, the first part FD_1 is firstly rearranged from the first edge region 821 to the center region 823 of the display panel 120 in the negative sequence, and next, the processing circuit 112 could further swap a data sequence of each of the first data units FD1 according to the at least one setting signal S_SET. That is, the data sequence of each of the first data units FD1 could be swapped in the manner of subpixel base. For example, the left first data unit FD1 is swapped from $D_m$, $D_{m-1}$ and $D_{m-2}$ to $D_{m-2}$, $D_{m-1}$, $D_m$ in the manner of subpixel base.

For the second part FD_2 of the second display data D_OUT, the second part FD_2 is firstly rearranged from the center region 823 to the second edge region 822 of the display panel 120 in the negative sequence, and next, the processing circuit 112 could further swap a data sequence of each of the second data units FD3 according to the at least one setting signal S_SET. That is, the data sequence of each of the second data units FD3 could be swapped in the manner of subpixel base as well as pixel base. For example, the left second data unit FD3 is swapped from $D_n$, $D_{n-1}$ and $D_{n-2}$ to $D_{n-2}$, $D_{n-1}$, $D_n$ in the manner of subpixel base.

Therefore, in the present embodiment, the data rearrangement operation includes the data swapping operation performed in the manner of subpixel base to flexibly adjust the first display data D_IN to obtain the second display data D_OUT to match more panel layout requirements and reduce the impact on panel manufacturing process.

Figure 17:
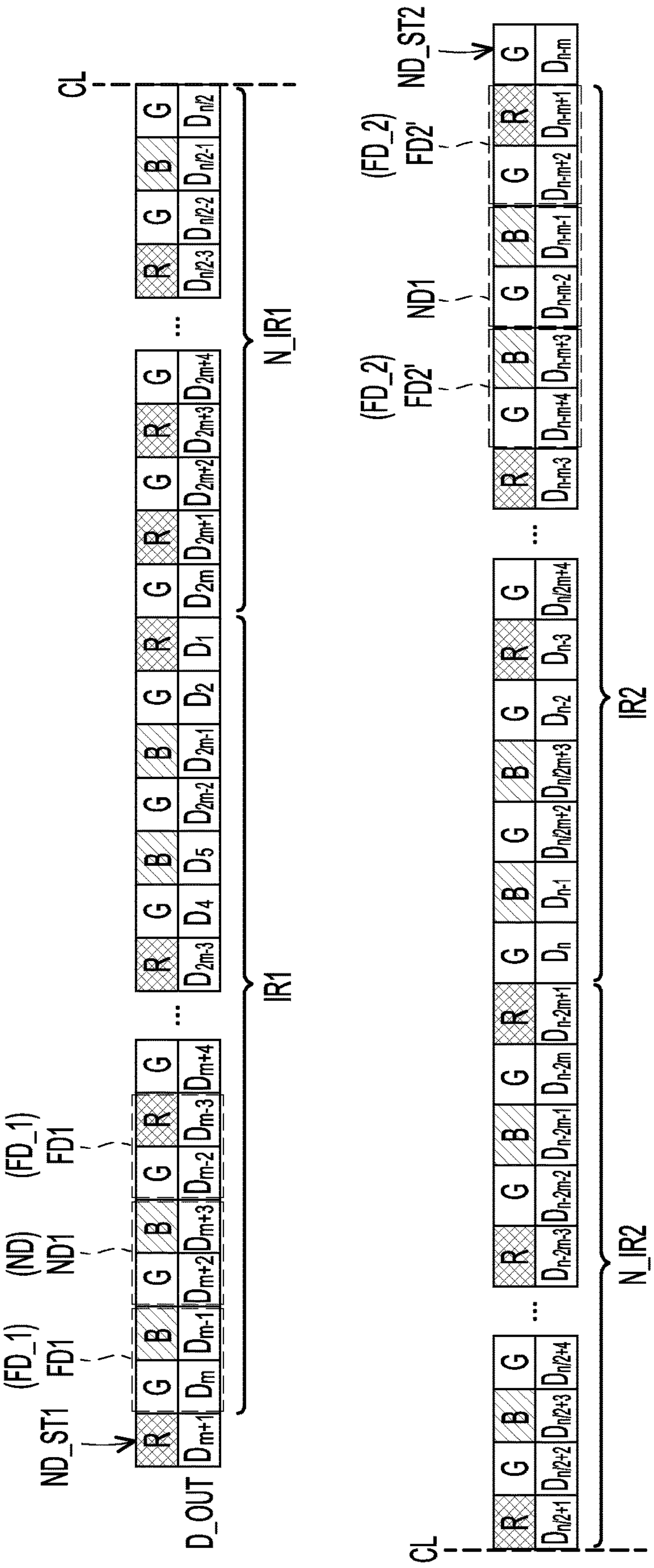
FIG. 17 is a schematic diagram illustrating a rearranged display data according to another embodiment of the invention.

FIG. 17 is a schematic diagram illustrating a rearranged display data according to another embodiment of the invention. Referring to FIG. 17, the first display data D_IN is shifted without swapping to generate the second display data D_OUT. The second display data D_OUT is also configured to drive the SPR display panel, and the data lines connected to the subpixel colors R and B may be routing in an identical metal layer, and the data lines connected to the subpixel color G may be routing in another metal layer different from the identical metal layer. Each of the first data units FD1, the second data units FD3, and the third data units ND1 is set to have the same number of data, e.g. two data. The first data units FD1 and the third data units ND1 are interlaced in the interlaced region IR1. The second data units FD3 and the third data units ND1 are interlaced in the interlaced region IR2.

For the third data unit ND_ST1 including the data $D_{m+1}$, the processing circuit 112 could shift the third part ND relative to the first part FD_1 according to the at least one setting signal S_SET, such that the third data unit ND_ST1 including the data $D_{m+1}$ is rearranged to left of the first data unit FD1 including the data $D_m$ and $D_{m-1}$. On the other hand, for the third data unit ND_ST2 including the data $D_{n-m}$, the processing circuit 112 could also shift the third part ND relative to the second part FD_2 according to the at least one setting signal S_SET, such that the third data unit ND_ST2 including the data $D_{n-m}$ is rearranged to right of the second data unit FD3 including the data $D_{n-m+2}$ and $D_{n-m+1}$. In the present embodiment, the number of shifted data is set as one data.

Therefore, in the present embodiment, the data rearrangement operation includes the data shift operation but not includes the data swapping operation to flexibly adjust the first display data D_IN to obtain the second display data D_OUT to match more panel layout requirements and reduce the impact on panel manufacturing process. In addition, the data shift operation without the data swapping operation could avoid the issue that the lengths of data lines are subject to incremental or decremental discontinuities.

Figure 18:
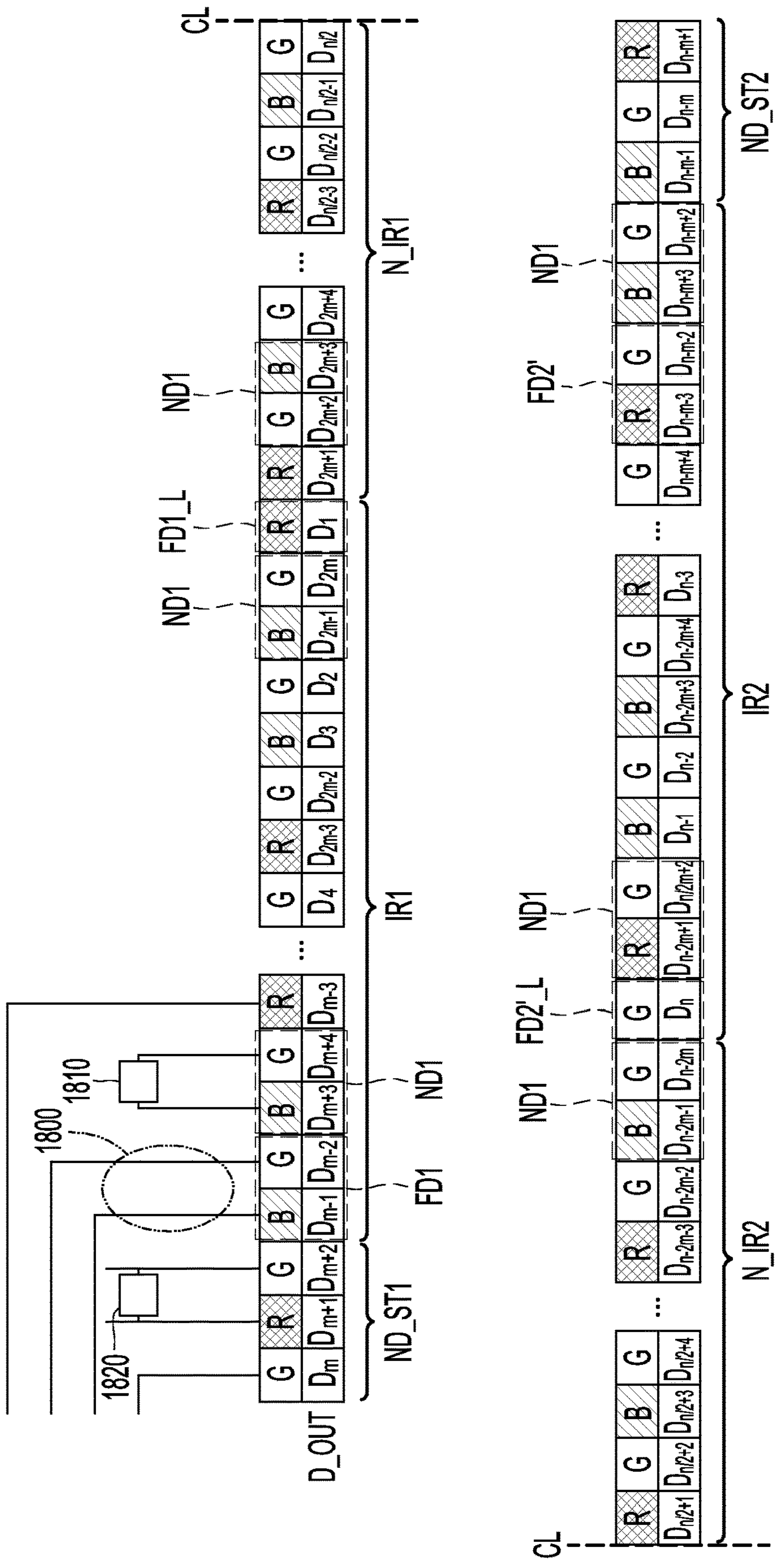
FIG. 18 is a schematic diagram illustrating a rearranged display data according to another embodiment of the invention.

FIG. 18 is a schematic diagram illustrating a rearranged display data according to another embodiment of the invention. Referring to FIG. 18, the first display data D_IN is shifted to generate the second display data D_OUT. The second display data D_OUT is configured to drive the SPR display panel, and the data lines connected to the subpixel colors R and B may be routing in an identical metal layer, and the data lines connected to the subpixel color G may be routing in another metal layer different from the identical metal layer.

In the present embodiment, the number of shifted data is set as three data. The third data unit ND_ST1 includes the data $D_m$, $D_{m+1}$ and $D_{m+2}$. The third data unit ND_ST2 includes the data $D_{n-m-1}$, $D_{n-m}$ and $D_{n-m+1}$. As a result, the first data unit FD1 including the data $D_{m-1}$ and $D_{m-2}$ is outputted to data lines 1800 that are located between two neighboring pixels 1810 and 1820.

In addition, the last first data unit FD1_L including the data $D_1$ is located between two neighboring third data units ND1, and the last first data unit FD1_L could be outputted to a dummy data line. Similarly, the last second data unit FD3_L including the data $D_n$ is located between two neighboring third data units ND1, and the last first data unit FD3_L could be outputted to another dummy data line.

Figure 19:
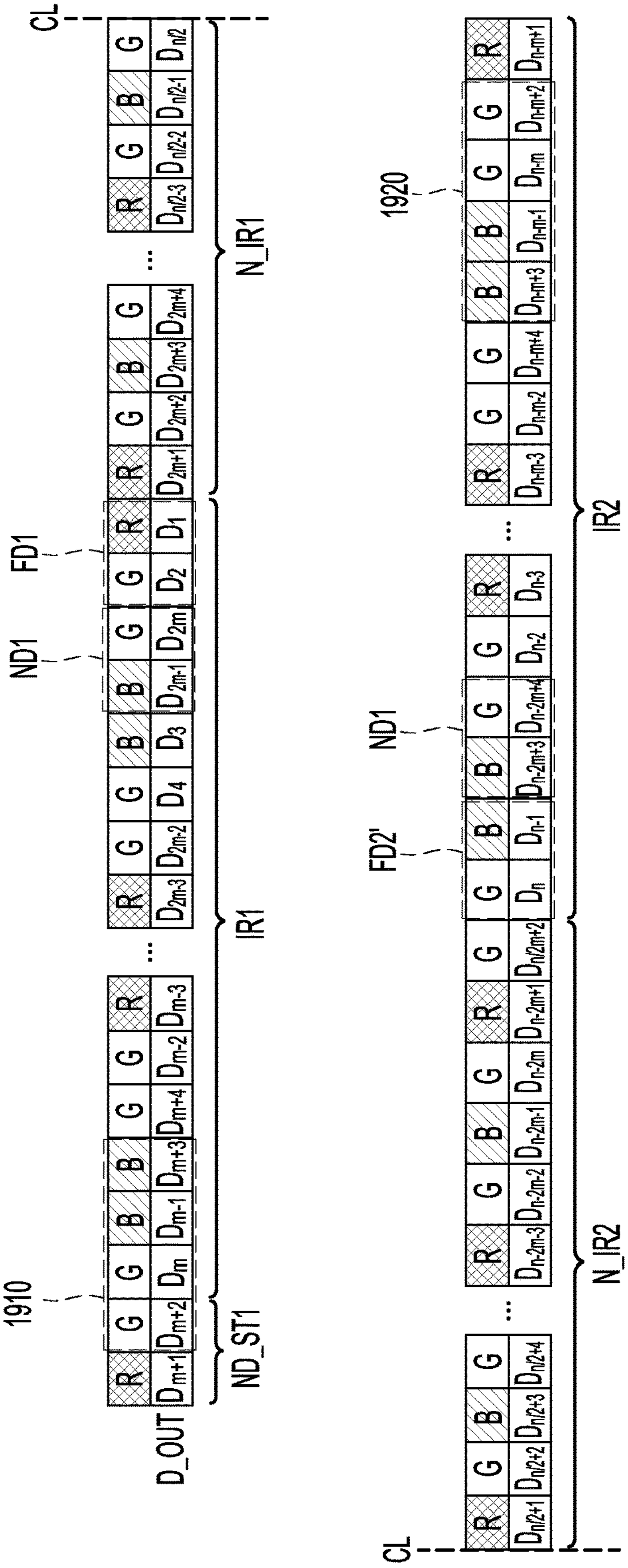
FIG. 19 is a schematic diagram illustrating a rearranged display data according to another embodiment of the invention.

FIG. 19 is a schematic diagram illustrating a rearranged display data according to another embodiment of the invention. Referring to FIG. 19, the first display data D_IN is shifted to generate the second display data D_OUT. The second display data D_OUT is configured to drive the SPR display panel. In the present embodiment, the number of shifted data is set as two data, and the data shift operation is only performed on one side, e.g. the left side. The third data unit ND_ST1 including the data $D_{m+1}$ and $D_{m+2}$ is shifted. As a result, the data sets 1910 and 1920 are outputted to drive subpixels of symmetric colors. In an embodiment, the number of data of each of the first data units FD1, the second data units FD3, and the third data units ND1 may be set as one data, and the number of shifted data may be also set as one data.

Figure 20:
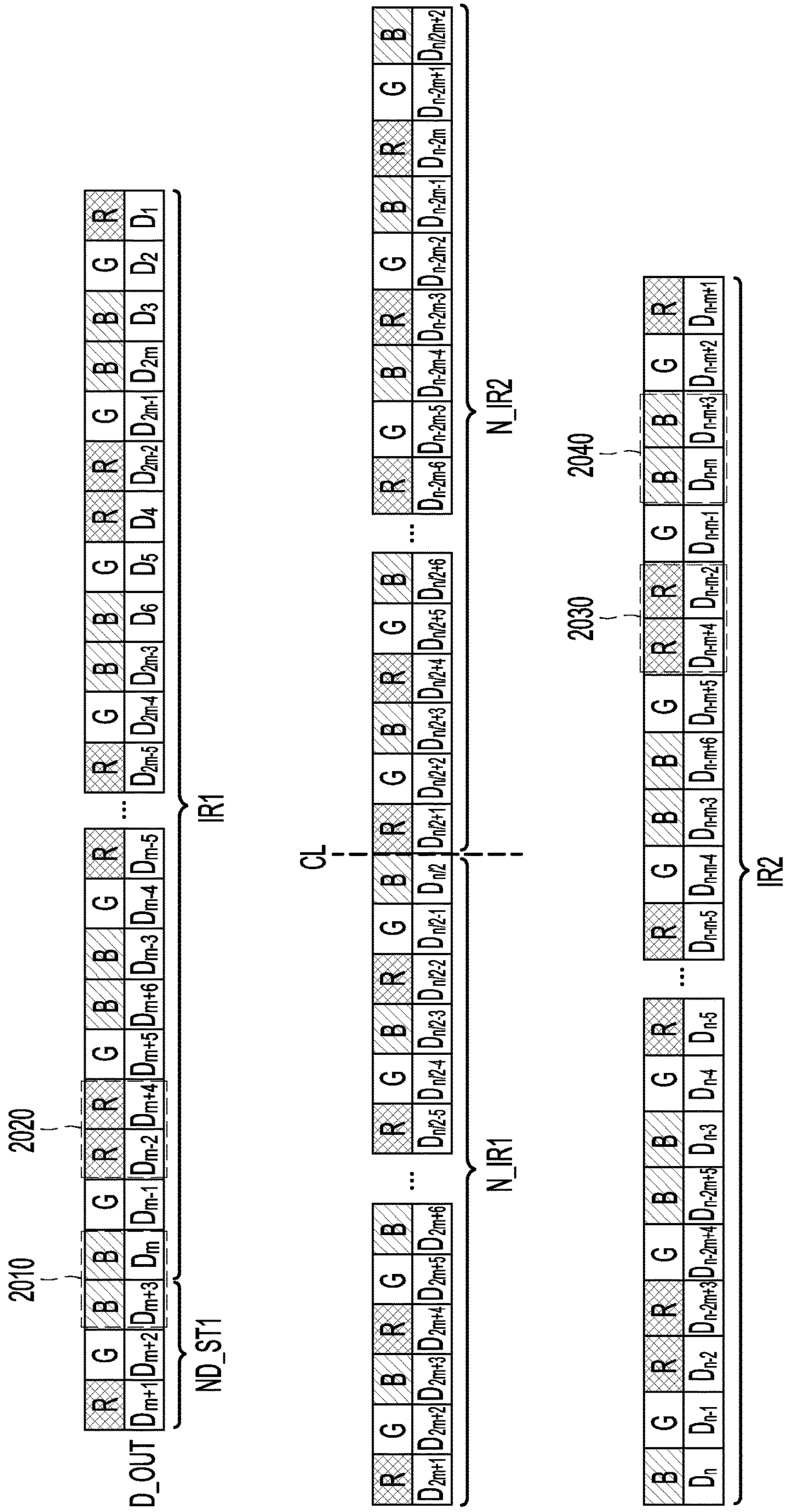
FIG. 20 is a schematic diagram illustrating a rearranged display data according to another embodiment of the invention.

FIG. 20 is a schematic diagram illustrating a rearranged display data according to another embodiment of the invention. Referring to FIG. 20, the first display data D_IN is shifted to generate the second display data D_OUT. The second display data D_OUT is configured to drive the display panel of true RGB. In the present embodiment, the number of shifted data is set as three data, and the data shift operation is only performed on one side, e.g. the left side. The third data unit ND_ST1 including the data $D_{m+1}$, $D_{m+2}$ and $D_{m+3}$ is shifted. As a result, the data sets 2010, 2020, 2030 and 2040 are outputted to drive subpixels of symmetric colors.

Figure 21:
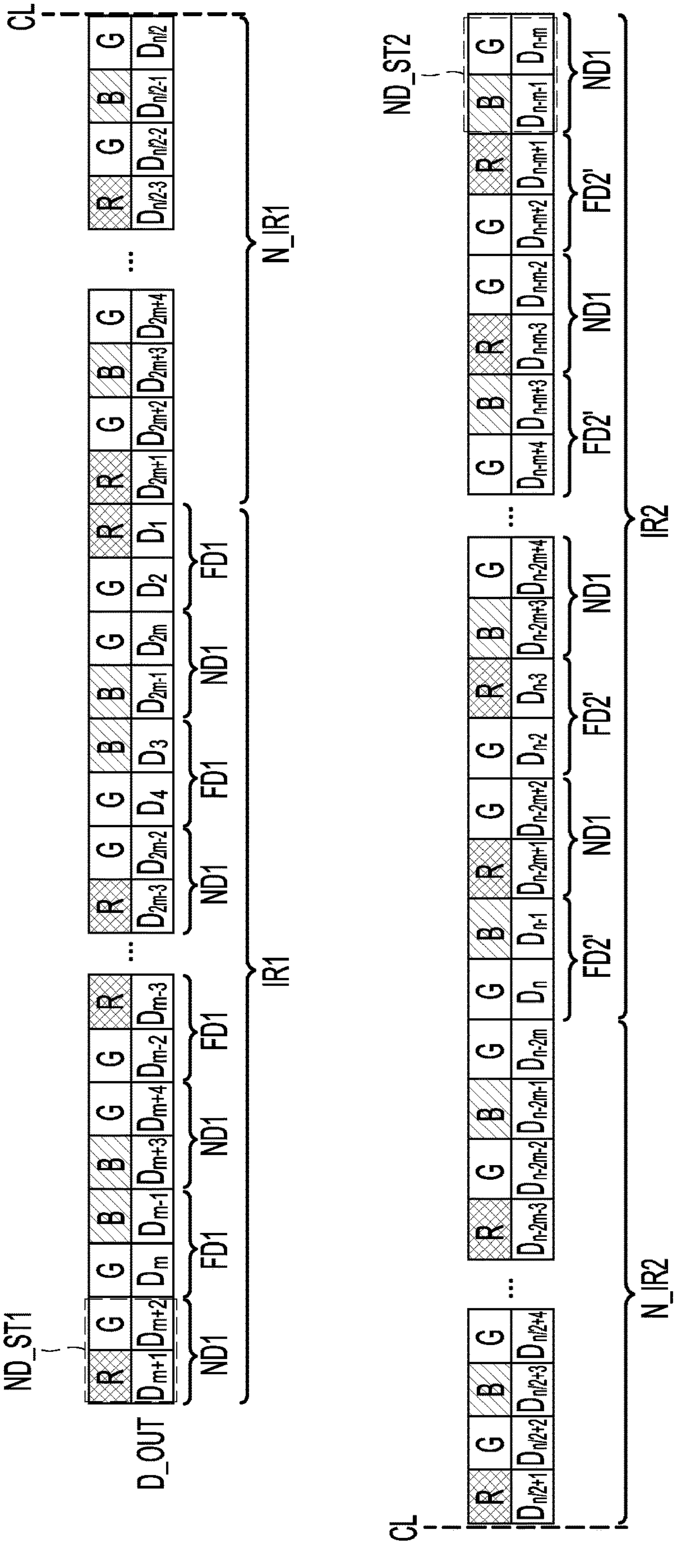
FIG. 21 is a schematic diagram illustrating a rearranged display data according to another embodiment of the invention.

FIG. 21 is a schematic diagram illustrating a rearranged display data according to another embodiment of the invention. Referring to FIG. 21, the first display data D_IN is shifted to generate the second display data D_OUT. The second display data D_OUT is configured to drive the SPR display panel. In the present embodiment, the number of shifted data is set as two data that is equal to the number of data of the third data unit ND1, and the data shift operation is performed on two sides. Since the number of shifted data is equal to the number of data of the third data unit ND1, it could be deemed that the starting data unit is changed from the first data unit FD1 to the third data unit ND1, and the interlaced sequence is changed from FD1, ND1, FD1, ND1 to ND1, FD1, ND1, FD1 in the interlaced region IR1.

Figure 22:
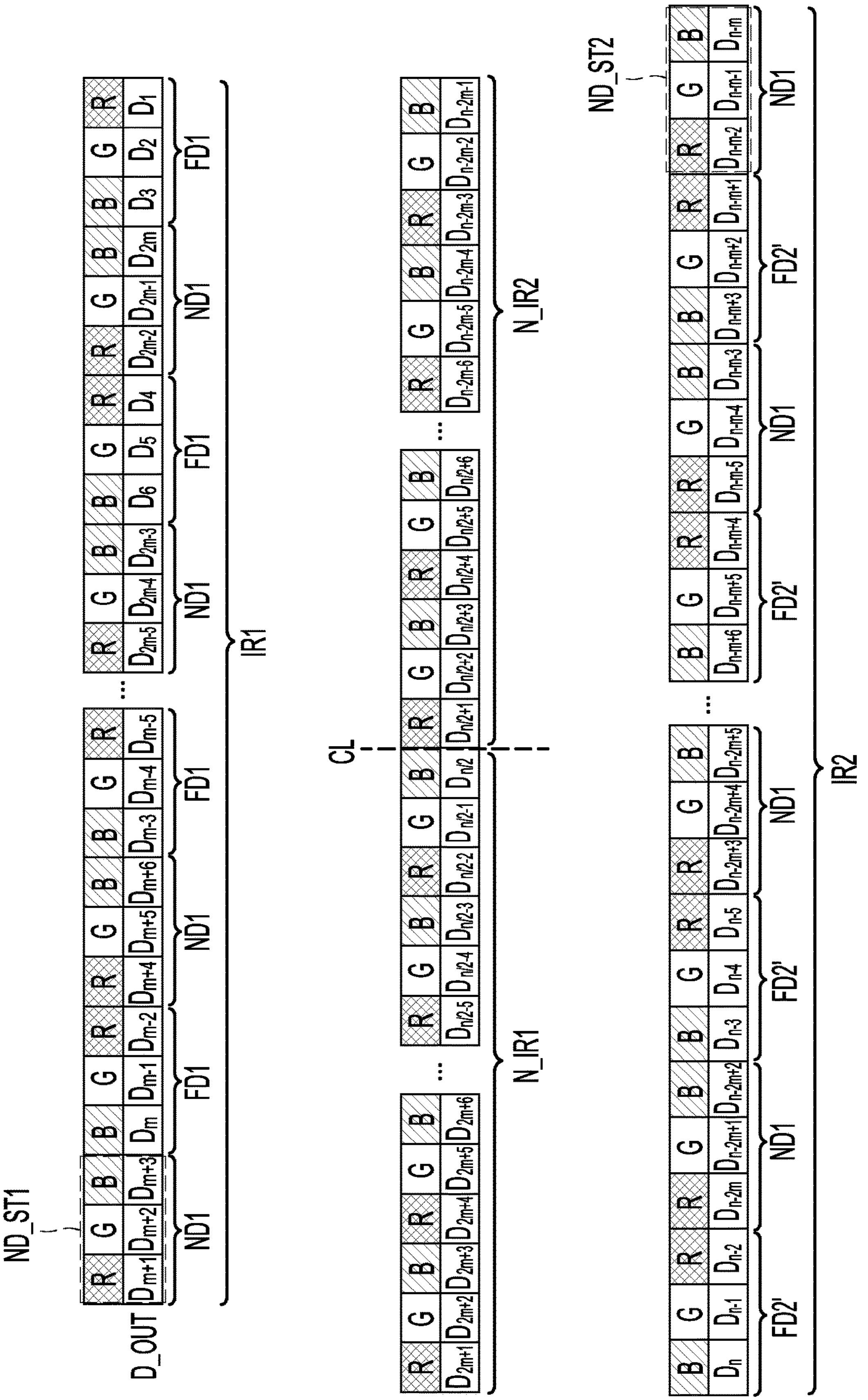
FIG. 22 is a schematic diagram illustrating a rearranged display data according to another embodiment of the invention.

FIG. 22 is a schematic diagram illustrating a rearranged display data according to another embodiment of the invention. Referring to FIG. 22, the first display data D_IN is shifted to generate the second display data D_OUT. The second display data D_OUT is configured to drive the display panel of true RGB. In the present embodiment, the number of shifted data is set as three data that is equal to the number of data of the third data unit ND1, and the data shift operation is performed on two sides. Since the number of shifted data is equal to the number of data of the third data unit ND1, it could be deemed that the starting data unit is changed from the first data unit FD1 to the third data unit ND1, and the interlaced sequence is changed from FD1, ND1, FD1, ND1 to ND1, FD1, ND1, FD1 in the interlaced region IR1.

Figure 23:
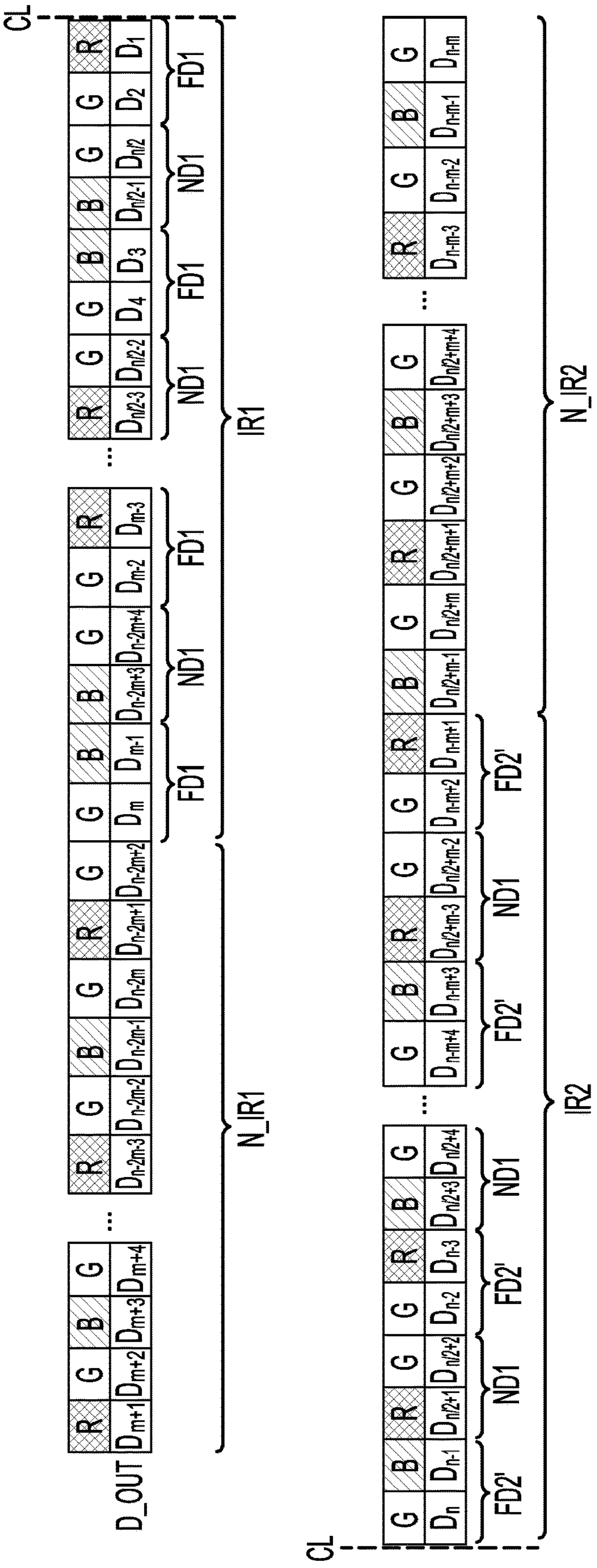
FIG. 23 is a schematic diagram illustrating a rearranged display data according to another embodiment of the invention.

FIG. 23 is a schematic diagram illustrating a rearranged display data according to another embodiment of the invention. Referring to FIG. 23, the first display data D_IN is shifted to generate the second display data D_OUT. The second display data D_OUT is configured to drive the SPR display panel. In the present embodiment, the number of shifted data is set to be equal to the number of data of the non-interlaced region NIR1 for the left side, and in the interlaced region IR1, the interlaced sequence is FD1, ND1, FD1, ND1 from the reference line CL to the non-interlaced region NIR1. On the other hand, the number of shifted data is set to be equal to the number of data of the non-interlaced region NIR2 for the right side, and in the interlaced region IR2, the interlaced sequence is FD1, ND1, FD1, ND1 from the reference line CL to the non-interlaced region NIR2.

In the present embodiment, the number of data of each of the first data units FD1, the second data units FD3, and the third data units ND1 may be set as two data, but the invention is not limited thereto. In an embodiment, the number of data of each of the first data units FD1 and the second data units FD3 may be set as two data, and the number of data of each of the third data units ND1 may be set as four data.

Figure 24:
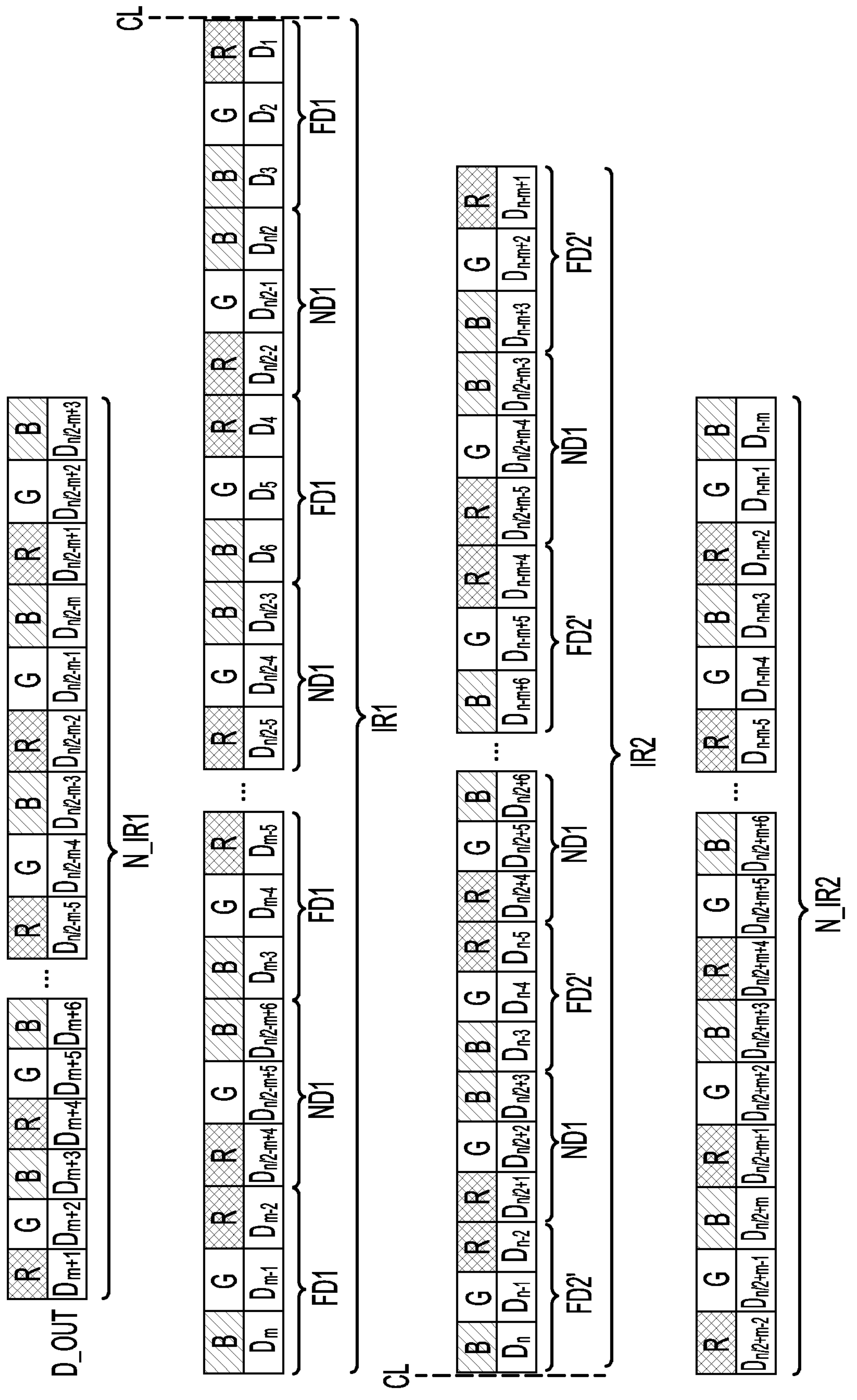
FIG. 24 is a schematic diagram illustrating a rearranged display data according to another embodiment of the invention.

FIG. 24 is a schematic diagram illustrating a rearranged display data according to another embodiment of the invention. Referring to FIG. 24, the first display data D_IN is shifted to generate the second display data D_OUT. The second display data D_OUT is configured to drive the display panel of true RGB. In the present embodiment, the number of shifted data is set to be equal to the number of data of the non-interlaced region NIR1 for the left side, and in the interlaced region IR1, the interlaced sequence is FD1, ND1, FD1, ND1 from the reference line CL to the non-interlaced region NIR1. On the other hand, the number of shifted data is set to be equal to the number of data of the non-interlaced region NIR2 for the right side, and in the interlaced region IR2, the interlaced sequence is FD3, ND1, FD3, ND1 from the reference line CL to the non-interlaced region NIR2.

Figure 25:
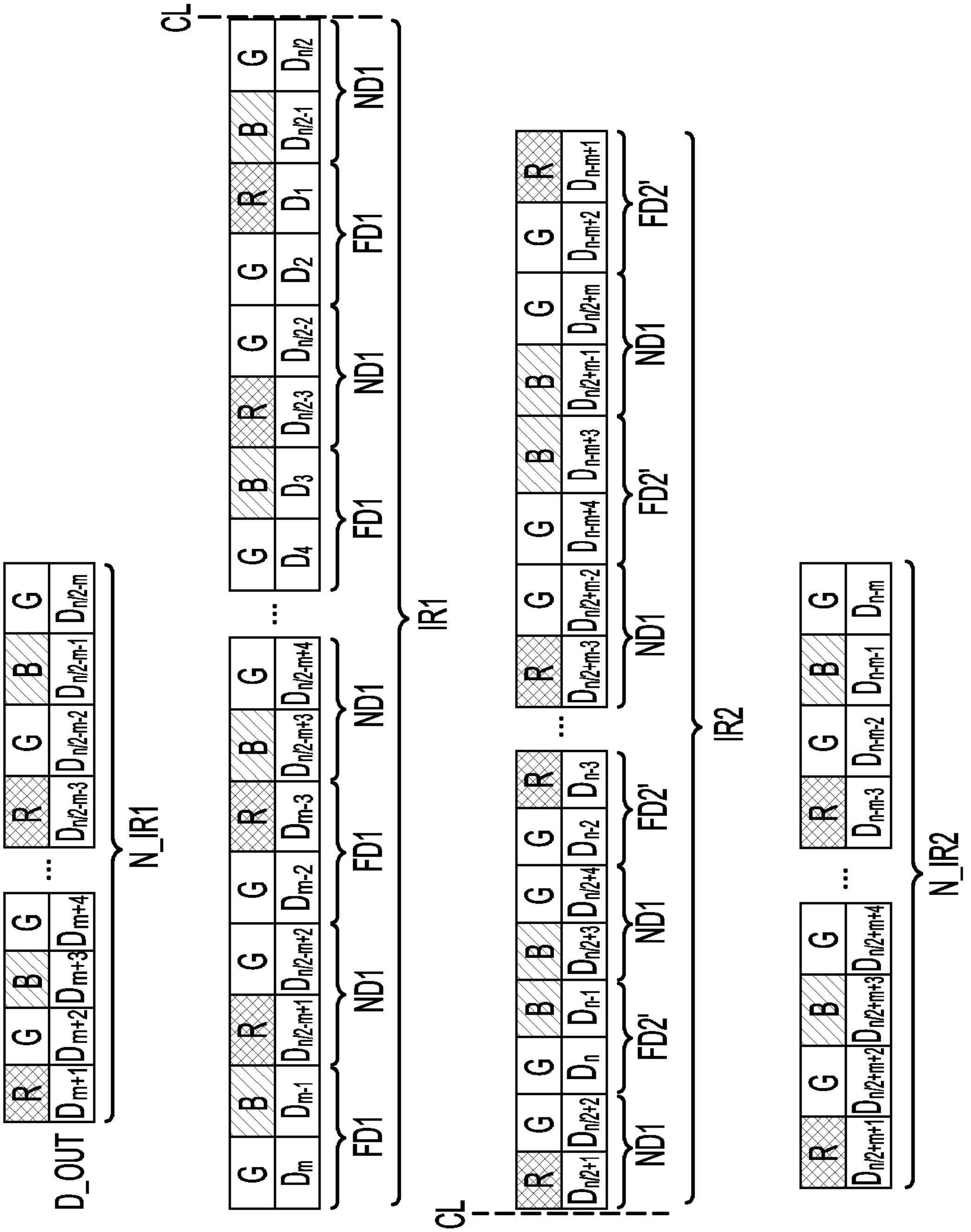
FIG. 25 is a schematic diagram illustrating a rearranged display data according to another embodiment of the invention.

FIG. 25 is a schematic diagram illustrating a rearranged display data according to another embodiment of the invention. Referring to FIG. 25, the first display data D_IN is shifted to generate the second display data D_OUT. The second display data D_OUT is configured to drive the SPR display panel. In the present embodiment, the number of shifted data is set to be equal to the number of data of the non-interlaced region NIR1 for the left side, and in the interlaced region IR1, the interlaced sequence is ND1, FD1, ND1, FD1 from the reference line CL to the non-interlaced region NIR1. On the other hand, the number of shifted data is set to be equal to the number of data of the non-interlaced region NIR2 for the right side, and in the interlaced region IR2, the interlaced sequence is ND1, FD3, ND1, FD3 from the reference line CL to the non-interlaced region NIR2.

Figure 26:
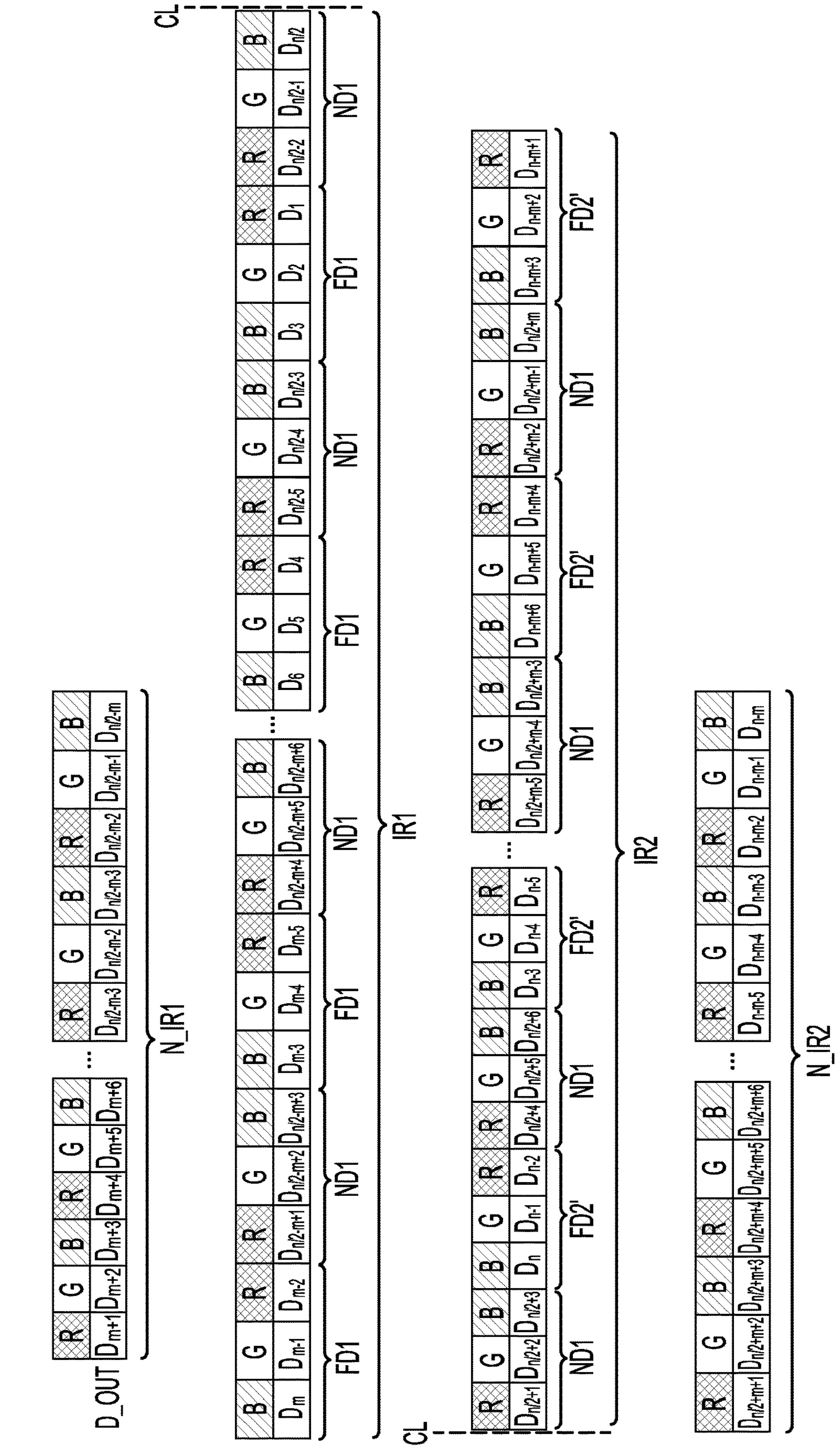
FIG. 26 is a schematic diagram illustrating a rearranged display data according to another embodiment of the invention.

FIG. 26 is a schematic diagram illustrating a rearranged display data according to another embodiment of the invention. Referring to FIG. 26, the first display data D_IN is shifted to generate the second display data D_OUT. The second display data D_OUT is configured to drive the display panel of true RGB. In the present embodiment, the number of shifted data is set to be equal to the number of data of the non-interlaced region NIR1 for the left side, and in the interlaced region IR1, the interlaced sequence is ND1, FD1, ND1, FD1 from the reference line CL to the non-interlaced region NIR1. On the other hand, the number of shifted data is set to be equal to the number of data of the non-interlaced region NIR2 for the right side, and in the interlaced region IR2, the interlaced sequence is ND1, FD3, ND1, FD3 from the reference line CL to the non-interlaced region NIR2.

Returning to FIG. 2 and FIG. 11, the processing circuit 112 rearranges the first display data D_IN to generate the second display data D_OUT according to the at least one setting signal S_SET. The at least one setting signal S_SET may include panel information, such that the rearranged second display data D_OUT could adaptively drive the display panel 120, which has a specified FIAA layout.

In the present embodiment, the at least one setting signal S_SET may include a plurality of setting signals S_FD, S_SEQ, S_FCD, S_NCD, S_SWAP and S_SFT to set parameters of the data rearrangement operation. For example, the setting signals S_FD, S_SEQ, S_FCD, S_NCD, S_SWAP and S_SFT and corresponding functions are listed in the following Table 1:

TABLE 1

| Setting signal | Function |
|---|---|
| S_FD | set a number of data of the first part and the second part |
| S_SEQ | set the first part and the second part to be arranged in a negative sequence or a positive sequence |
| S_FCD | set a number of data of the first data units and the second data units |
| S_NCD | set a number of data of the third data units |
| S_SWAP | set swapping sequences and swapping manners of the first data units and the second data units |
| S_SFT | set a number of shifted data of the first part and the second part |

Therefore, the processing circuit 112 could rearrange the first display data D_IN to generate the second display data D_OUT according to at least one of the setting signals S_FD, S_SEQ, S_FCD, S_NCD, S_SWAP and S_SFT, such that the second display data D_OUT could adaptively drive the display panel 120 having FIAA layout.

In summary, in the embodiment, the data sequence of the display data outputted from the driver circuit is rearranged to adaptively drive the display panel. The display data corresponding to the edge regions of the display panel is required to be rearranged. The rearranged display data may be arranged in the negative sequence or the positive sequence in the interlaced regions. In addition, the data rearrangement operation may include the data swapping operation and the data shift operation to flexibly adjust the display data to match more panel layout requirements and reduce the impact on panel manufacturing process.

It will be apparent to those skilled in the art that various modifications and variations could be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A method for driving a display panel, comprising:
receiving a first display data having a first data sequence, wherein the first display data comprises a first part, a second part, and a third part, and the third part is disposed between the first part and the second part which are configured to drive data lines located in opposite sides of the display panel;
rearranging the first part and the second part of the first display data to generate a second display data having a second data sequence according to at least one setting signal, wherein the first part of the first display data is arranged from a first edge region to a center region of the display panel in a negative sequence after rearrangement; and
outputting the second display data to drive the display panel,
wherein the second data sequence is different from the first data sequence.

2. The method for driving the display panel of claim 1, wherein the step of rearranging the first part and the second part of the first display data to generate the second display data according to the at least one setting signal further comprises:
maintaining a data sequence of the third part unchanged according to the at least one setting signal.

3. The method for driving the display panel of claim 1, wherein the first part of the first display data is configured to drive data lines located in a first edge region of the display panel, and the second part of the first display data is configured to drive data lines located in a second edge region of the display panel.

4. The method for driving the display panel of claim 3, wherein the third part of the first display data is configured to drive data lines located in a center region of the display panel, and the first edge region and the second edge region are located at two opposite sides of the center region.

5. The method for driving the display panel of claim 1, wherein the second part of the first display data is arranged from the center region to a second edge region of the display panel in the negative sequence after rearrangement, and the first edge region and the second edge region are located at two opposite sides of the center region.

6. The method for driving the display panel of claim 1,
wherein the first part of the first display data comprises a plurality of first data units, a second part of the first display data comprises a plurality of second data units, and the third part of the first display data comprises a plurality of third data units, and
wherein the step of rearranging the first part and the second part of the first display data to generate the second display data having the second data sequence according to the at least one setting signal comprises:
interlacing the first data units with the third data units; and
interlacing the second data units with the third data units.

7. The method for driving the display panel of claim 6, wherein the step of rearranging the data sequence of the first part and the data sequence of the second part according to the at least one setting signal further comprises:
swapping a data sequence of each of the first data units according to the at least one setting signal; and
swapping a data sequence of each of the second data units according to the at least one setting signal.

8. The method for driving the display panel of claim 7, wherein the data sequence of each of the first data units and the data sequence of each of the second data units are swapped in a manner of subpixel base.

9. The method for driving the display panel of claim 8, wherein the data sequence of each of the first data units and the data sequence of each of the second data units are further swapped in a manner of pixel base.

10. The method for driving the display panel of claim 1, wherein the step of rearranging the first part and the second part of the first display data to generate the second display data having the second data sequence according to the at least one setting signal comprises:

shifting the third part relative to the first part according to the at least one setting signal.

11. The method for driving the display panel of claim 10, wherein the step of rearranging the first part and the second part of the first display data to generate the second display data having the second data sequence according to the at least one setting signal further comprises:

shifting the third part relative to the second part according to the at least one setting signal.

12. The method for driving the display panel of claim 1, further comprising:

storing data indexes of the second data sequence to a buffer circuit.

13. The method for driving the display panel of claim 1, wherein the display panel comprises a plurality of pixels, and each of the pixels comprises two subpixels, wherein one of the two subpixels is a subpixel of a first color, and the other one of the two subpixels is a subpixel of a second color or a third color.

14. The method for driving the display panel of claim 1, wherein the display panel comprises a plurality of pixels, and each of the pixels comprises three subpixels of a first color, a second color and a third color.

15. A driver circuit, configured to drive a display panel, the driver circuit comprising:

a processing circuit, configured to:

receive a first display data having a first data sequence, wherein the first display data comprises a first part, a second part, and a third part, and the third part is disposed between the first part and the second part which are configured to drive data lines located in opposite sides of the display panel, rearrange the first part and the second part of the first display data to generate a second display data having a second data sequence according to at least one setting signal, and output the second display data to drive the display panel, wherein the first part of the first display data is arranged from a first edge region to a center region of the display panel in a negative sequence after rearrangement, wherein the second data sequence is different from the first data sequence.

16. The driver circuit of claim 15, wherein the processing circuit is configured to maintain a data sequence of the third part unchanged according to the at least one setting signal.

17. The driver circuit of claim 15, wherein the first part of the first display data is configured to drive data lines located in a first edge region of the display panel, and the second part of the first display data is configured to drive data lines located in a second edge region of the display panel.

18. The driver circuit of claim 17, wherein the third part of the first display data is configured to drive data lines located in a center region of the display panel, and the first edge region and the second edge region are located at two opposite sides of the center region.

19. The driver circuit of claim 15, wherein the second part of the first display data is arranged from the center region to a second edge region of the display panel in the negative sequence after rearrangement, and the first edge region and the second edge region are located at two opposite sides of the center region.

20. The driver circuit of claim 15, wherein the first part of the first display data comprises a plurality of first data units, a second part of the first display data comprises a plurality of second data units, and the third part of the first display data comprises a plurality of third data units, and wherein the processing circuit is configured to interlace the first data units with the third data units, and interlace the second data units with the third data units.

21. The driver circuit of claim 20, wherein the processing circuit is configured to swap a data sequence of each of the first data units according to the at least one setting signal, and swap a data sequence of each of the second data units according to the at least one setting signal.

22. The driver circuit of claim 21, wherein the processing circuit is configured to swap the data sequence of each of the first data units and the data sequence of each of the second data units in a manner of subpixel base.

23. The driver circuit of claim 22, wherein the processing circuit is configured to swap the data sequence of each of the first data units and the data sequence of each of the second data units in a manner of pixel base.

24. The driver circuit of claim 15, wherein the processing circuit is configured to shift the third part relative to the first part according to the at least one setting signal.

25. The driver circuit of claim 24, wherein the processing circuit is configured to shift the third part relative to the second part according to the at least one setting signal.

26. The driver circuit of claim 15, further comprising a buffer circuit, wherein the processing circuit is configured to store data indexes of the second data sequence to the buffer circuit.

27. The driver circuit of claim 15, wherein the at least one setting signal includes a first setting signal, and the first setting signal is configured to set a number of data of the first part and the second part.

28. The driver circuit of claim 15, wherein the at least one setting signal includes a second setting signal, and the second setting signal is configured to set the first part and the second part to be arranged in a negative sequence or a positive sequence.

29. The driver circuit of claim 20, wherein the at least one setting signal includes a third setting signal, and the third setting signal is configured to set a number of data of the first data units and the second data units.

30. The driver circuit of claim 20, wherein the at least one setting signal includes a fourth setting signal, and the fourth setting signal is configured to set a number of data of the third data units.

31. The driver circuit of claim 21, wherein the at least one setting signal includes a fifth setting signal, and the fifth setting signal is configured to set swapping sequences and swapping manners of the first data units and the second data units.

32. The driver circuit of claim 24, wherein the at least one setting signal includes a sixth setting signal, and the sixth setting signal is configured to set a number of shifted data of the first part and the second part.

33. The driver circuit of claim 15, wherein the display panel comprises a plurality of pixels, and each of the pixels comprises two subpixels, wherein one of the two subpixels is a subpixel of a first color, and the other one of the two subpixels is a subpixel of a second color or a third color.

34. The driver circuit of claim 15, wherein the display panel comprises a plurality of pixels, and each of the pixels comprises three subpixels of a first color, a second color and a third color.

35. A method for driving a display panel, comprising:

receiving a first display data having a first data sequence, wherein the first display data comprises a first part, a second part, and a third part, and the third part is disposed between the first part and the second part which are configured to drive data lines located in opposite sides of the display panel;

rearranging the first part and the second part of the first display data to generate a second display data having a second data sequence according to at least one setting signal, wherein the first part of the first display data is arranged from a first edge region to a center region of the display panel in a positive sequence after rearrangement; and outputting the second display data to drive the display panel, wherein the second data sequence is different from the first data sequence.

36. A driver circuit, configured to drive a display panel, the driver circuit comprising:

a processing circuit, configured to:

receive a first display data having a first data sequence, wherein the first display data comprises a first part, a second part, and a third part, and the third part is disposed between the first part and the second part which are configured to drive data lines located in opposite sides of the display panel, rearrange the first part and the second part of the first display data to generate a second display data having a second data sequence according to at least one setting signal, and output the second display data to drive the display panel, wherein the first part of the first display data is arranged from a first edge region to a center region of the display panel in a positive sequence after rearrangement, wherein the second data sequence is different from the first data sequence.

* * * * *